United States Patent
Tseng et al.

(10) Patent No.: US 12,369,061 B2
(45) Date of Patent: Jul. 22, 2025

(54) METHODS AND APPARATUS FOR PERFORMING IDLE MODE MEASUREMENT IN RRC INACTIVE STATE

(71) Applicant: SHARP KABUSHIKI KAISHA, Sakai (JP)

(72) Inventors: Yung-Lan Tseng, Taipei (TW); Hsin-Hsi Tsai, Taipei (TW); Mei-Ju Shih, Taipei (TW); Ming-Hung Tao, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 378 days.

(21) Appl. No.: 17/943,813

(22) Filed: Sep. 13, 2022

(65) Prior Publication Data

US 2023/0088189 A1 Mar. 23, 2023

Related U.S. Application Data

(60) Provisional application No. 63/244,185, filed on Sep. 14, 2021.

(51) Int. Cl.
*H04W 24/10* (2009.01)
*H04W 52/02* (2009.01)

(52) U.S. Cl.
CPC ....... *H04W 24/10* (2013.01); *H04W 52/0225* (2013.01)

(58) Field of Classification Search
CPC .................................................. H04W 24/10
See application file for complete search history.

(56) References Cited

U.S. PATENT DOCUMENTS

| 12,143,962 | B2 * | 11/2024 | Chen ...................... H04W 68/00 |
| 2021/0227586 | A1 * | 7/2021 | Huang .................. H04W 76/27 |
| 2021/0243777 | A1 * | 8/2021 | Tsai ..................... H04W 74/006 |
| 2021/0337602 | A1 * | 10/2021 | Liu ....................... H04W 74/002 |
| 2022/0046749 | A1 * | 2/2022 | Lin ........................ H04W 76/30 |
| 2022/0078875 | A1 * | 3/2022 | Ou ........................ H04W 76/27 |
| 2022/0086899 | A1 * | 3/2022 | Shih ..................... H04L 5/0053 |

(Continued)

FOREIGN PATENT DOCUMENTS

| CN | 111034327 A | 4/2020 |
| WO | 2023009821 A1 | 2/2023 |

OTHER PUBLICATIONS

3GPP TS 38.331, "3rd Generation Partnership Project; Technical Specification Group Radio Access Network; NR; Radio Resource Control (RRC) protocol specification (Release 16)", V16.5.0 (Jun. 2021).

(Continued)

*Primary Examiner* — Fahmida S Chowdhury
(74) *Attorney, Agent, or Firm* — ScienBiziP, P.C.

(57) ABSTRACT

A method performed by a user equipment (UE) is provided. In the method, at least one idle mode measurement configuration is received from a cell of a serving radio access network (RAN) via a downlink control signaling. Whether a small data transmission (SDT) procedure is ongoing while the UE is staying in a radio resource control (RRC) inactive state is determined. Whether to perform an idle mode measurement in the RRC inactive state according to the at least one idle mode measurement configuration is determined based on a determination result of whether the SDT procedure is ongoing.

20 Claims, 6 Drawing Sheets

(56) References Cited

U.S. PATENT DOCUMENTS

| | | | |
|---|---|---|---|
| 2023/0030498 A1* | 2/2023 | Nickisch | H04L 5/001 |
| 2023/0247721 A1* | 8/2023 | Kim | H04W 76/27 |
| | | | 370/329 |
| 2023/0276520 A1* | 8/2023 | Xu | H04W 76/27 |
| | | | 370/329 |
| 2023/0284289 A1* | 9/2023 | Watts | H04W 76/19 |
| | | | 370/329 |
| 2023/0328835 A1* | 10/2023 | Wu | H04W 76/38 |
| | | | 370/329 |
| 2024/0155374 A1* | 5/2024 | Wei | H04W 74/0833 |
| 2024/0163960 A1* | 5/2024 | Wang | H04W 12/041 |
| 2024/0334527 A1* | 10/2024 | Turtinen | H04W 74/0833 |
| 2024/0373391 A1* | 11/2024 | Li | H04W 76/20 |

OTHER PUBLICATIONS

3GPP TS 38.214, "3rd Generation Partnership Project; Technical Specification Group Radio Access Network; NR; Physical layer procedures for data (Release 16)", V16.6.0 (Jun. 2021).

ZTE Corporation (Rapporteur): "SDT corrections", 3GPP Draft; R2-2206827, 3rd Generation Partnership Project (3GPP), RAN WG2, Electronic; May 9, 2022-May 20, 2022 (May 27, 2022).

"3rd Generation Partnership Project; Technical Specification Group Radio, Access Network; NR; Radio Resource Control (RRC) protocol specification (Release 17)", 3GPP Draft; 38.331 V17.0.0, 3rd Generation Partnership Project (Apr. 14, 2022).

"3rd Generation Partnership Project; Technical Specification Group Radio Access Network; NR; Radio Resource Control (RRC) protocol specification (Release 17)", 3GPP Standard; Technical Specification; 3GPP TS 38.331, 3rd Generation Partnership Project (3GPP), RAN WG2, V17.1.0 (Jul. 19, 2022), pp. 1-1273.

CATT: "Consideration on CP issues", 3GPP Draft; R2-2110399, 3rd Generation Partnership Project (3GPP), Ran WG2, electronic; Nov. 1, 2021-Nov. 12, 2021 (Oct. 22, 2021).

CATT: "Consideration on Some CP issues", 3GPP Draft; R2-2201571, 3rd Generation Partnership Project (3GPP), Ran WG2, electronic; Jan. 17, 2022-Jan. 25, 2022 (Jan. 11, 2022).

"3rd Generation Partnership Project; Technical Specification Group Radio Access Network; NR; Radio Resource Control (RRC) protocol specification (Release 16)", 3GPP Draft; 38.331 V16.5.0 (Jul. 6, 2021).

ZTE Coroporation (Rapporteur): "Introduction of SDT", 3GPP Draft; R2-2105927, 3rd Generation Partnership Project (3GPP), Mobile Competence Centre, RAN WG2, Electronic; May 19, 2021-May 27, 2021 (May 10, 2021).

Intel Corporation: "Signalling and NAS-AS interaction for SDT", 3GPP Draft; R2-2102841, 3rd Generation Partnership Project (3GPP), RAN WG2, Electronic meeting; Apr. 12, 2021-Apr. 20, 2021 (Apr. 2, 2021).

* cited by examiner

METHODS AND APPARATUS FOR PERFORMING IDLE MODE MEASUREMENT IN RRC INACTIVE STATE

CROSS-REFERENCE TO RELATED APPLICATION

The present application claims the benefit of and priority to U.S. Provisional Patent Application Ser. No. 63/244,185, filed on Sep. 14, 2021, entitled "SIGNALING RADIO BEARER CONFIGURATION FOR SMALL DATA TRANSMISSION," the contents of which are hereby fully incorporated herein by reference for all purposes.

FIELD

The present disclosure generally relates to wireless communications and, more specifically, to methods for performing an idle mode measurement in a radio resource control (RRC) inactive state, and to user equipment (UE) configured to use such methods.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for next-generation wireless communication systems.

SUMMARY

The present disclosure is directed to a method for performing an idle mode measurement in a radio resource control (RRC) inactive state, and to user equipment (UE) configured to use the method.

In a first aspect of the present disclosure, a method performed by a UE is provided. The method includes receiving and storing at least one idle mode measurement configuration from a first cell of a serving radio access network (RAN) via a downlink control signaling; determining whether a first small data transmission (SDT) procedure is ongoing while the UE is staying in an RRC inactive state; and determining whether to perform an idle mode measurement in the RRC inactive state according to the at least one idle mode measurement configuration and based on whether the first SDT procedure is ongoing.

In an implementation of the first aspect, the method further includes performing the idle mode measurement in the RRC inactive state in a case that the first SDT procedure is determined to be not ongoing, and not performing the idle mode measurement in the RRC inactive state in a case that the first SDT procedure is determined to be ongoing.

In another implementation of the first aspect, whether the first SDT procedure is ongoing is determined based on whether an SDT failure detection timer is counting by the UE, and the method further includes performing the idle mode measurement in the RRC inactive state in a case that the SDT failure detection timer is not counting, and not performing the idle mode measurement in the RRC inactive state in a case that the SDT failure detection timer is counting.

In another implementation of the first aspect, the method further includes starting to count an idle mode measurement timer to zero upon receiving the at least one idle mode measurement configuration. The at least one idle mode measurement configuration includes an initial value of the idle mode measurement timer. The UE keeps counting the idle mode measurement timer upon determining not to perform the idle mode measurement while the first SDT procedure is ongoing.

In another implementation of the first aspect, the method further includes releasing the stored at least one idle mode measurement configuration in a case that the idle mode measurement timer expires.

In another implementation of the first aspect, the at least one idle mode measurement configuration includes at least one of an idle/inactive measurement configuration or a logged measurement configuration.

In another implementation of the first aspect, the first SDT procedure is a random access-small data transmission (RA-SDT) procedure or a configured grant-small data transmission (CG-SDT) procedure.

In another implementation of the first aspect, the at least one idle mode measurement configuration is received from the first cell of the serving RAN via one or more SDT packet receptions during a second SDT procedure.

In another implementation of the first aspect, the method further includes transmitting at least one idle mode measurement report to a second cell of the serving RAN via one or more SDT packet transmissions during the first SDT procedure.

In another implementation of the first aspect, the serving RAN includes at least one of a New Radio (NR) cell or an evolved-universal terrestrial radio access (E-UTRA) cell, and each of the idle mode measurement configuration, the downlink control signaling and the SDT procedure is associated with an NR radio access technology (RAT) or an E-UTRA.

In a second aspect of the present disclosure, a UE is provided. The UE includes at least one processor, and at least one memory coupled to the at least one processor. The at least one memory stores at least one computer-executable instructions that, when executed by the at least one processor, causes the UE to perform operations. The operations include receiving and storing at least one idle mode measurement configuration from a first cell of a serving radio access network (RAN) via a downlink control signaling; determining whether a first small data transmission (SDT) procedure is ongoing while the UE is staying in an RRC inactive state; and determining whether to perform an idle mode measurement in the RRC inactive state according to the at least one idle mode measurement configuration and based on whether the first SDT procedure is ongoing.

In an implementation of the second aspect, the operations further include performing the idle mode measurement in the RRC inactive state in a case that the first SDT procedure is determined to be not ongoing, and not performing the idle mode measurement in the RRC inactive state in a case that the first SDT procedure is determined to be ongoing.

In another implementation of the second aspect, whether the first SDT procedure is ongoing is determined based on whether an SDT failure detection timer is counting by the UE, and the operations further include performing the idle mode measurement in the RRC inactive state in a case that the SDT failure detection timer is not counting, and not performing the idle mode measurement in the RRC inactive state in a case that the SDT failure detection timer is counting.

In another implementation of the second aspect, the operations further include starting to count an idle mode measurement timer to zero upon receiving the at least one idle mode measurement configuration. The at least one idle mode measurement configuration includes an initial value of the idle mode measurement timer. The UE keeps counting the idle mode measurement timer upon determining not to perform the idle mode measurement while the first SDT procedure is ongoing. Then, the UE still keeps counting the idle mode measurement timer upon determining to perform the idle mode measurement while the first SDT procedure is not ongoing.

In another implementation of the second aspect, the operations further include releasing the stored at least one idle mode measurement configuration in a case that the idle mode measurement timer expires.

In another implementation of the second aspect, the at least one idle mode measurement configuration includes at least one of an idle/inactive measurement configuration or a logged measurement configuration.

In another implementation of the second aspect, the first SDT procedure is a random access-small data transmission (RA-SDT) procedure or a configured grant-small data transmission (CG-SDT) procedure.

In another implementation of the second aspect, the at least one idle mode measurement configuration is received from the first cell of the serving RAN via one or more SDT packet receptions during a second SDT procedure.

In another implementation of the second aspect, the operations further include transmitting at least one idle mode measurement report to a second cell of the serving RAN via one or more SDT packet transmissions during the first SDT procedure.

In another implementation of the second aspect, the serving RAN includes at least one of a New Radio (NR) cell or an evolved-universal terrestrial radio access (E-UTRA) cell, and each of the idle mode measurement configuration, the downlink control signaling and the SDT procedure is associated with an NR radio access technology (RAT) or an E-UTRA.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
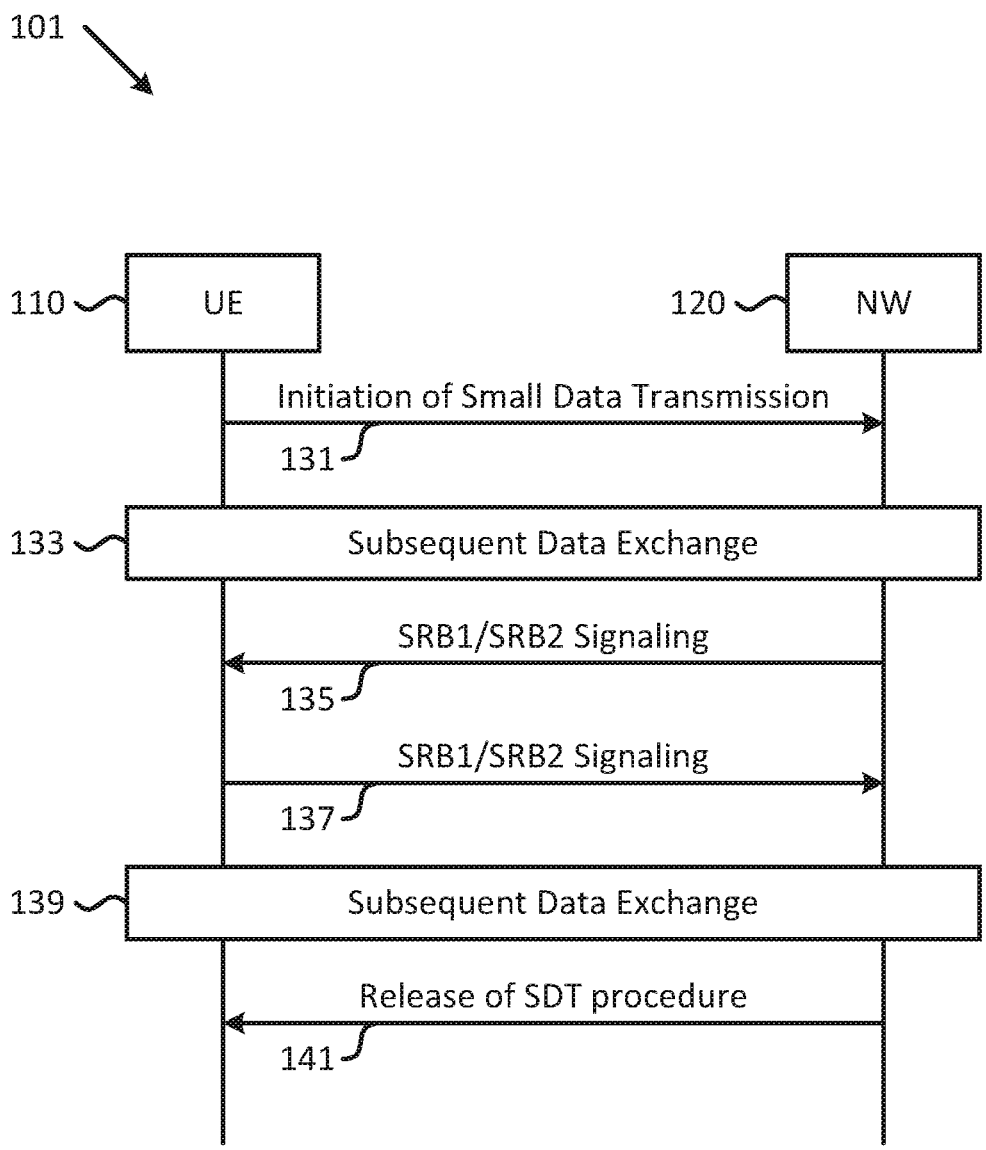
FIG. 1 is a communication diagram illustrating communications between a user equipment (UE) and a random access network (RAN) according to an example implementation of the present disclosure.

Some of the terms mentioned in the present disclosure are defined as follows. Unless otherwise specified, the terms in the present disclosure have the following meanings.

| Abbreviation | Full name |
| --- | --- |
| 5G-S-TMSI | 5G S-Temporary Mobile Subscriber Identity |
| BA | Bandwidth Adaptation |
| BSR | Buffer Status Report |
| BWP | Bandwidth Part |
| CA | Carrier Aggregation |
| CCCH | Common Control Channel |
| CE | Control Element |
| CH | Channel |
| CORESET | Control Resource Set |
| CSI | Channel State Information |
| CSS | Common Search Space |
| DCI | Downlink Control Information |
| DCP | DCI with CRC scrambled by PS-RNTI |
| DL | Downlink |
| DRX | Discontinuous Reception |
| ID | Identification |
| LBT | Listen Before Talk |
| LSB | Least Significant Bit |
| MAC | Medium Access Control |
| MAC CE | MAC Control Element |
| MCG | Master Cell Group |
| MIMO | Multi-In Multi-Out |
| MSB | Most Significant Bit |
| NID | Network Identifier |
| NR-U | New Radio Unlicensed |
| NW | Network |
| PDCCH | Physical Downlink Control Channel |
| PDSCH | Physical Downlink Shared Channel |
| PHR | Power Headroom Report |
| PLMN | Public Land Mobile Network |
| PUCCH | Physical Uplink Control Channel |
| PUSCH | Physical Uplink Shared Channel |
| RAR | Random Access Response |
| Rel | Release |
| RLE | Radio Link Failure |
| RNTI | Radio Network Temporary Identifier |
| RRC | Radio Resource Control |
| RRM | Radio Resource Management |
| SCS | Subcarrier Spacing |
| SL | Sidelink |
| SNPN | Standalone Non-Public Network |
| SPS | Semi-Persistent Scheduling |
| SR | Scheduling Request |
| SS | Search Space |
| SSSG | Search Space Set Group |
| UE | User Equipment |
| UL | Uplink |
| USS | UE-specific search space |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "in some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" include the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the example implementations disclosed are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UNITS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, enhanced L (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells.

Each cell may be operable to provide services to at least one UE within its radio coverage. More specifically, each cell (often referred to as a serving cell) may provide services to serve one or more Ues within its radio coverage (e.g., each cell schedules the Downlink (DL) and optionally Uplink (UL) resources to at least one UE within its radio coverage for DL and optionally UL packet transmissions). The BS may communicate with one or more Ues in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (Pcell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (Scells). An SCG may refer to a group of serving cells associated with the Secondary Node (SN), including the SpCell and optionally one or more Scells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaptation may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Besides, an SL resource may also be provided in an NR frame to support ProSe services.

FIG. 1 is a communication diagram illustrating communications between a UE and a RAN according to an example implementation of the present disclosure.

In this disclosure, mechanisms that support Access Stratum (AS) signaling and/or Non-Access Stratum (NAS) radio bearer exchange during an RRC idle mode/inactive state packet transmission procedure (which is also known as a small data transmission (SDT) procedure in some technical documents, such as 3GPP technical specifications) are provided. In the following description, the RRC idle mode/inactive state packet transmission is referred to as the SDT for convenience.

Firstly, a UE may receive an SDT configuration from its serving cell (e.g., an Evolved Universal Terrestrial Radio Access (E-UTRA) cell or a New Radio (NR) cell) or its serving base station (e.g., an E-UTRA Network (E-UTRAN) eNB or an NR gNB)

In some implementations, the SDT configuration may be received while the UE is staying in an E-UTRA/NR RRC connected state.

In some implementations, the SDT configuration may be transmitted via an RRCConnectionRelease/RRCRelease message which instructs the UE to move to an E-UTRA/NR RRC inactive state or an E-UTRA/NR RRC idle state.

In some implementations, the SDT configuration may be transmitted via an RRCConnectionReconfiguration/RRCReconfiguration message while the UE is staying in the RRC connected state.

In some implementations, the SDT configuration may be received while the UE is staying in an E-UTRA/NR RRC idle/inactive state.

In some implementations, the SDT configuration may be transmitted via system information (e.g., SIB1 or other SI) via broadcasting approach or via SI on-demanding procedure.

After receiving the SDT configuration from the serving cell, the UE may store the received SDT configuration after the UE moves to or when the UE stays in the RRC inactive state.

As shown in FIG. 1, in some implementations, the UE 110 may initiate an SDT procedure 101 while one or more uplink data arrives as the AS layer forms the upper layers and/or when the criteria for SDT initiation are satisfied (e.g., based on pending UL data amount and data volume threshold, DL RSRP threshold, CG-SDT validation, RA-SDT validation, etc.) in the UE side. In addition, all or part of the arrived uplink packets are associated with one or more logical channels (or Radio Link Control (RLC) Bearers/radio bearers) which are enabled for the SDT (e.g., configured by the serving cell in the SDT configuration). In this case, the UE 110 may start an SDT procedure 101 to transmit the pending UL data while the UE 110 is staying in the RRC inactive state or after the UE 110 moves to the RRC inactive state.

In some implementations, the UE 110 may be configured to transmit the pending UL data via one of the following approaches:
  1) Uplink Configured Grant (UL-CG) procedure (which is also known as an CG-SDT procedure); and
  2) Random Access (RA) procedure (which is also known as an RA-SDT procedure).

Details of the CG-SDT procedure and the RA-SDT procedure will be described below.

In some implementations, the UE 110 may initiate an SDT procedure 101 by transmitting an uplink packet with or without an RRCResumeRequest message (action 131). After receiving the UL data (with or without an RRCResumeRequest message) from the UE 110, the serving cell (as one of the operating (LTE/NR) cells in the NW 120) may allow (and may then further extend) the SDT procedure 101 (e.g., CG-SDT/RA-SDT procedure) by further configuring DL/UL dynamic grants to enable the UE 110/serving cell to keep exchanging pending DL/UL data in the subsequent data exchange phase (e.g., actions 133 to 139). Finally, the serving cell may transmit a DL control signaling (e.g., an RRCConnectionRelease message or an RRCRelease message) to the UE 110 to finish/terminate the SDT procedure 101 (action 141).

In some implementations, the UE 110 may implement cell (re)selection procedure while the UE 110 is staying in the RRC inactive state and the UE 110 may be able to initiate an SDT procedure 101 to another cell (e.g., another operating cell configured in the NW 120) after cell (re)selection. In this case, the original serving cell, which configures the SDT configuration to the UE 110 and then instructs the UE 110 to move to the RRC inactive state, is called the "anchor cell" in the serving RAN and the cell to which the UE 110 connects for an active SDT procedure 101 is called the "serving cell" in the serving RAN. The serving cell and the anchor cell may be configured by different base stations and the base stations may communicate with each other via backhaul connections (e.g., X2 interface or Xn interface).

After the SDT procedure 101 is initiated by the UE 110, the signaling radio bearers (e.g., SRB1 and/or SRB2) may also be resumed by the UE 110 for the SDT procedure 101. However, it also means some further control mechanisms may be needed in the UE side and/or the serving RAN because much AS/NAS control signaling could be transmitted via the SRB1/SRB2 during the SDT procedure 101 but some control signaling may be restricted/prohibited from being exchanged during the SDT procedure 101 (even though the SRB1/SRB2 is resumed during the SDT procedure 101). In this disclosure, mechanisms that support AS/NAS control signaling exchange during the SDT procedure 101 are provided.

In addition, in this disclosure, proposals for the UE side and the RAN side about idle/inactive measurement during the SDT procedure 101 are presented.

Impact on Idle/Inactive Measurements

The impact of the UE/RAN on the measurements during SDT configurations and SDT procedures are described below. Here, proposed designs are discussed based on the idle/inactive measurement. However, the proposed designs would not be limited to the idle/inactive measurement and may also be applicable to other scenarios (e.g., logged measurement).

In some implementations, the UE may receive a dedicated idle/inactive measurement configuration via UE-specific control signaling (e.g., RRCRelease message). The idle/inactive measurement configuration may include any combination of target RAT information, target frequency carrier information, target cell information, and measurement criteria information. In some implementations, the UE may receive common/cell-specific idle/inactive measurement configuration via broadcasting system information (e.g., SIM).

In addition, a measurement duration may be configured within the idle/inactive measurement configuration. After receiving the measurement duration, the UE may start a timer (e.g., T331) by setting its initial value to the received measurement duration. The UE may store the received idle/inactive measurement configuration and then implement/perform idle/inactive measurement while the timer (e.g., T331) is still counting-down/running. Then, if the timer (e.g., T331) is not running (e.g., stops or expires), the UE may drop/release the stored idle/inactive measurement configuration, and then the UE may stop performing the idle/inactive measurement.

In some implementations, the UE may receive the idle/inactive measurement configuration including the measurement duration from its serving cell via broadcasting system information. In this case, the UE may store the broadcast idle/inactive measurement configuration (e.g., while the timer (e.g., T331) is counting-down/running) and then implement/perform the idle/inactive measurement accordingly.

In some implementations, the UE may implement idle/inactive measurement based on the broadcast idle/inactive measurement configuration (e.g., via System Information Blocks broadcasting) from its serving cell while the timer (e.g., T331) is not running according to different UE implementations.

In some implementations, the UE may transmit UL data with a multiplexed RRCResumeRequest message during an SDT procedure (e.g., a CG-SDT procedure or an RA-SDT procedure). It should be noted that the purpose of the RRCResumeRequest message is not to resume its RRC connection (e.g., to move to the RRC connected state) with the serving RAN but to enable the serving cell to identify by which UE is the UL data transmitted.

In some implementations, the UE may transmit an RRCResumeRequest message without being multiplexed with any UL pending data (e.g., RRCResumeRequest with ResumeCause or other Ies specific for SDT, which enables the serving cell to identify that the RRCResumeRequest message is transmitted by the UE for an SDT procedure).

In some implementations, after receiving the RRCResumeRequest message, the serving cell may transmit an RRCResume message to the UE to instruct the UE to move to the RRC connected state. In addition, the serving cell may further request the UE to transmit an idle/inactive measurement report by configuring an information element (e.g., idleModeMeasurementReq=true) in the RRCResume message.

It is noted that the serving cell may not transmit the RRCResume message immediately right after receiving the RRCResumeRequest message (with or without multiplexed UL data). Instead, the serving cell may transmit the RRCResume message to the UE after the subsequent data exchange is completed after the UE transmits the RRCResumeRequest message to the serving cell.

It is also noted that the RRCResumeRequest message generated by the UE for an SDT procedure may include a specific ResumeCause associated with the SDT procedure. In some implementations, the UE may use a specific ResumeCause (e.g., "SmallDataTransmission") to inform the serving cell that the purpose of this RRCResumeRequest message is for an SDT procedure. In some implementations, the specific ResumeCause may be configured with the UE status of an SDT procedure (e.g., whether the UE still has pending uplink packets staying in the Layer-2 buffer); therefore, the UE may inform the UE status to the serving cell by transmitting the specific ResumeCause within the RRCResumeRequest message after the UE initiates the SDT procedure.

After receiving the RRCResume message (e.g., with the IE idleModeMeasurementReq=true) from the serving cell (e.g., during the SDT procedure), the UE may move to the RRC connected state and reply with the RRCResumeComplete message to the serving cell. In addition, in some implementations, the UE may transmit available idle/inactive measurement reports in the RRCResumeComplete message. It is noted that the available idle/inactive measurement reports may be associated with one or more target RATs (e.g., E-UTRA and/or New Radio)/one or more target frequency carriers (e.g., frequency carrier list represented by NR-Absolute Radio-Frequency Channel Number (ARFCN) value and/or E-UTRA-ARFCN value)/one or more target cells (e.g., cell list represented by E-UTRA physical cell identities and/or NR physical cell identities).

In some implementations, the serving cell may transmit an RRCResume message to the UE without indicating "idleModeMeasurementReq=true" in the RRCResume message. In this case, the UE may transmit the RRCResumeComplete message with an indicator (e.g., idleMeasAvailable=true) to inform the serving cell that the UE has available (E-UTRA/NR) idle/inactive measurement reports.

In some implementations, after receiving the RRCResumeRequest message (e.g., when the last serving cell fails to retrieve or verify UE context stored in the last serving RAN), the serving cell may transmit an RRCSetup message to the UE to instruct the UE to move to the RRC connected state. In addition, the serving cell may further request the UE to transmit an idle/inactive measurement report by configuring an information element (e.g., idleModeMeasurementReq=true) in the RRCSetup message.

It is noted that the serving cell may not transmit the RRCSetup message immediately right after receiving the RRCResumeRequest message (with multiplexed UL data). Instead, the serving cell may transmit the RRCResume message to the UE after the subsequent data exchange is completed after the UE transmits the RRCResumeRequest message to the serving cell.

In some implementations, after receiving the RRCSetup message (e.g., with the IE idleModeMeasurementReq=true) from the serving cell (e.g., during the SDT procedure), the UE may move to the RRC connected state and reply with an RRCSetupComplete message to the serving cell.

In some implementations, after receiving the RRCSetup message from the serving cell, the UE may move to the RRC idle state (or idle mode) and release the stored SDT configuration (e.g., CG-SDT/RA-SDT configuration). However, in some implementations, the MAC entity in the UE side (e.g., the UE 110 shown in FIG. 1) may not be released in this situation therefore the pending uplink data may still be buffered in the MAC entity after the UE receives the RRCSetup message. In some implementations, the MAC entity may be released in this situation (e.g., after RRCSetup message reception) and the pending uplink data may be cleared after the UE receives the RRCSetup message.

In addition, after receiving the RRCSetup message from the serving cell, the UE may transmit available idle/inactive measurement reports in the RRCSetupComplete message.

In some implementations, the serving cell may transmit an RRCSetup message to the UE without further indicating "idleModeMeasurementReq=true" in the RRCSetup message. In this case, the UE may transmit the RRCSetupComplete message with an indicator (e.g., idleMeasAvailable=true) to inform the serving cell that the UE has available (E-UTRA/NR) idle/inactive measurement reports. Then, after the UE moves to the RRC connected state, the serving cell may request the UE to transmit the idle/inactive measurements pending in the UE side by transmitting another idle/inactive measurement enquiry message to the UE.

In some implementations, the RRCResumeRequest may be transmitted via Msg3 and/or MsgA, (e.g., if the SDT procedure is an RA-SDT procedure).

In some implementations, the RRCResumeRequest may be transmitted via a UL resource configured by CG (e.g., if the SDT procedure is a CG-SDT procedure)

In some implementations, the RRCResumeRequest may be transmitted via the very first UL transmission of the SDT procedure.

In some implementations, after receiving the RRCResumeRequest message, the serving cell may transmit a specific message (e.g., with the IE idleModeMeasurementReq=true) to the UE to instruct the UE stay in the RRC inactive state, keep performing the SDT procedure, and request the idle/inactive measurement report stored in the UE side.

In some implementations, the specific message may be transmitted via Msg4, MsgB, and/or via any DL assignment during the subsequent data transmission phase (e.g., if the SDT procedure is an RA-SDT procedure).

In some implementations, the specific message may be transmitted via feedback (e.g., DL/UL scheduling) for the RRCResumeRequest message. The feedback may be transmitted within a window/timer for the CG-SDT procedure. The window/timer may be started after the UE transmits the RRCResumeRequest message.

In some implementations, the specific message may be an RRC message, a MAC CE, and/or DCI.

In some implementations, after receiving the specific message (e.g., with/including the IE idleModeMeasurementReq=true) from the serving cell (e.g., during the SDT procedure), the UE may stay in the RRC inactive state, and/or may keep performing the SDT procedure. In addition, the UE may transmit available idle/inactive measurement reports via a UL resource (e.g., scheduled by a dynamic grant or configured by a CG-SDT configuration) during the SDT procedure.

In some implementations, the UE may be configured with an RRC-less SDT procedure, which means the UE may transmit one or more UL packets to the serving cell without transmitting the RRCResumeRequest message to the serving cell. In this case, the serving cell may transmit an RRCResume message or a dedicated RRC message to instruct the UE to move into the RRC connected state to the UE after the serving cell receives the UL data from the UE. In some implementations, the serving cell may further indicate "idleModeMeasurementReq=true" in the RRCResume message or the dedicated RRC message.

After receiving the RRCResume message or the dedicated RRC message from the serving cell (e.g., during the RRC-less SDT procedure), the UE may move to the RRC connected state and reply with an RRCResumeComplete message or an RRC message responding to the dedicated RRC message (with available idle/inactive measurement reports). In some implementations, after receiving the RRCResume message or the dedicated RRC message from the serving cell, the UE may move to the RRC connected state and release/suspend the stored SDT configuration (e.g., CG-SDT/RA-SDT configuration). However, in some implementations, the MAC entity (of the UE side) may not be released/reset in this situation; therefore, the pending uplink data may still be buffered in the MAC entity after the UE receives the RRCResume message.

In some implementations, the serving cell may transmit an RRCSetup message to the UE after the serving cell receives the UL data from the UE. In some implementations, the serving cell may further indicate "idleModeMeasurementReq=true" in the RRCSetup message. In some implementations, after receiving the RRCSetup message from the serving cell, the UE may move to the RRC idle state (or idle mode) and release the stored SDT configuration (e.g., CG-SDT/RA-SDT configuration). However, in some implementations, the MAC entity may not be released/reset in this situation; therefore, the pending uplink data may still be buffered in the MAC entity after the UE receives the RRCSetup message. In some implementations, the MAC entity may be released/reset in this situation (e.g., after the RRCSetup message reception) and the pending uplink data may be cleared after the UE receives the RRCSetup message.

After receiving the RRCSetup message from the serving cell (e.g., during the RRC-less SDT procedure), the UE may move to the RRC connected state and reply with an RRCSetupComplete message (with available idle/inactive measurement reports).

In some implementations, the serving cell may transmit a UEInformationRequest message during the SDT procedure. In addition, the UEInformationRequest message may include an information element (e.g., idleModeMeasurementReq={true}) to request the UE to transmit available idle/inactive measurement reports to the serving cell (e.g., during a CG-SDT/RA-SDT procedure). In some other implementations, the serving cell may transmit a UEInformationRequest message after the UE leaves the SDT procedure (e.g., after the UE moves to the RRC connected state). In addition, the UEInformationRequest message may include an information element (e.g., idleModeMeasurementReq={true}) to request the UE to transmit available idle/inactive measurement reports to the serving cell (e.g., during a CG-SDT/RA-SDT procedure).

After receiving the request for the idle/inactive measurement report from the serving cell, the UE may reply with a UEInformationResponse message, which may include the available (E-UTRA/NR) idle/inactive measurement reports, to the serving cell (e.g., during the same CG-SDT/RA-SDT procedure).

In some implementations, the UE may transmit the idle/inactive measurement report via SRB1. In some implementations, the UE may transmit the idle/inactive measurement report via SRB2. In some implementations, the UE may transmit the idle/inactive measurement report via CCCH and/or DCCH.

It is noted that the measurement criteria may include any combinations of Reference Signal Received Power (RSRP), Reference Signal Received Quality (RSRQ), Received Signal Strength Indicator (RSSI), channel Busy Ratio (CBR), and beam measurement results measured by the UE in downlink direction.

In some implementations, an SDT procedure may be started while at least one of the following events happens:
1) while the SDT failure detection timer is started to be counted by the UE;
2) while the UE initiates an RA-SDT procedure by transmitting MSG1/MSG3 during a 4-step RA procedure or MSGA during a 2-step RA procedure;
3) while the UE initiates a CG-SDT procedure by accessing the UL configured grant; and
4) when the UE transmits an RRCResumeRequest message to the serving cell.

In some implementations, the SDT procedure may be terminated while at least one of the following events happens:
1) after the UE receives an RRCRelease message/RRCResume message/RRCSetup message from the serving cell;
2) while the SDT failure detection timer associated with the running SDT procedure expires;
3) while an SDT Timing Advance Timer expires;
4) upon the UE re-selecting to another cell due to an (idle mode) mobility event, where the idle mode may include an RRC idle state and/or an RRC inactive state;
5) upon a (DL/UL) beam failure event happening during the SDT procedure;
6) upon a Radio Link Failure (RLF) event happening during the SDT procedure;
7) upon the UE moving to the RRC idle state;
8) upon the UE moving to the RRC inactive state;
9) upon the UE moving to the RRC connected state; and
10) upon the UE receiving a fallback indication (e.g., which is used to instruct the UE to terminate the SDT procedure and initiate a non-SDT procedure, e.g., RRC connection resume/establishment procedure).

Figure 2:
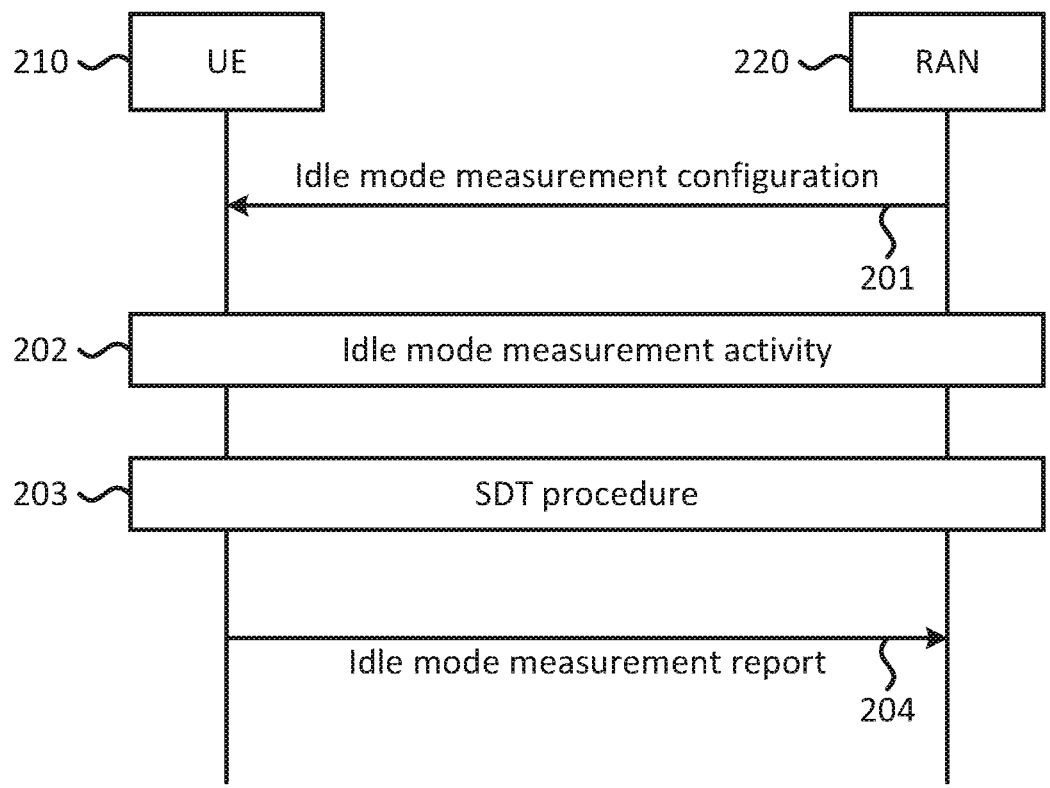
FIG. 2 is a communication diagram illustrating an overlap at the user equipment (UE) side between an idle mode measurement activity and a small data transmission (SDT) procedure in time domain.

FIG. 2 is a communication diagram illustrating an overlap in the UE side between an idle mode measurement activity and an SDT procedure in time domain.

Referring to FIG. 2, UE behaviors about idle mode measurement activity and SDT procedure are illustrated.

Firstly, in action 201, the UE 210 may receive an idle mode measurement configuration from the serving RAN 220 (e.g., via broadcasting system information or via UE-specific control signaling, such as an RRCReconfiguration message).

In some implementations, the idle mode measurement configuration may include at least one of an idle/inactive measurement configuration or a logged measurement configuration, which instructs the UE 210 to measure DL channel conditions (e.g., DL-RSRP, DL-RSRQ, DL-RSSI) between the UE 210 and the serving RAN 220. The serving RAN 220 may be, for example, composed by one or more base stations/cells.

After receiving the idle mode measurement configuration, in action 202, the UE 210 may start an idle mode measurement activity (e.g., an idle/inactive measurement activity and/or a logged measurement activity) and start to count a timer to zero (e.g., a first timer (T330) associated with a logged measurement activity and/or a second timer (T331) associated with an idle/inactive measurement activity). The UE 210 may maintain the idle mode measurement activity while associated timer is counting.

In some implementations, after the timer (e.g., T330/T331) is counted to zero, the UE 210 may release the stored idle mode measurement configuration and stop the idle mode measurement activity. However, the idle mode measurement results observed during action 202 (e.g., "idle/inactive measurement results" and/or "logged measurement results") may still be kept by the UE 210 and then the UE 210 may be able to report the idle mode measurement reports (e.g., "idle/inactive measurement report" and/or "logged measurement report") to its serving RAN 220 later (e.g., in action 204). In some implementations, the UE may receive both of the idle/inactive measurement configuration and the logged measurement configuration simultaneously or at different timings. Therefore, the UE may implement both of the idle/inactive measurement activity and the logged measurement activity simultaneously and independently, and both of the measurement activities may (partially) overlap in time domain in the UE side.

In some implementations, one or both of the idle/inactive measurement activity and the logged measurement activity may overlap with the SDT procedure in time domain. In some implementations, the UE may receive the idle mode measurement configuration (e.g., action 201) earlier than initiation of the SDT procedure (e.g., action 203). In some implementations, the UE may receive the idle mode measurement configuration (e.g., action 201) later than initiation of the SDT procedure (e.g., action 203) in time domain.

In some implementations, the UE 210 may also be triggered (e.g., by the NAS layer or RRC layer of the UE 210) to implement an SDT procedure (e.g., action 203) while the UE 210 is implementing an idle mode measurement activity. In some implementations, the UE 210 may receive an idle mode measurement configuration (e.g., in action 201) while the UE 210 is implementing an SDT procedure. In other words, the idle mode measurement activity and the SDT procedure may overlap in time domain. However, due to hardware/software limitations, some UEs may or may not be capable of implementing both of the idle mode measurement activity (e.g., action 202) and the SDT procedure (e.g., action 203) simultaneously. In addition, the mutual impacts between both of the idle mode measurement activity and the SDT procedure may need to be further addressed to make sure that a UE can work fluently when the UE is configured with both SDT configuration and idle mode measurement configuration, no matter whether the UE is capable of implementing both simultaneously.

It is noted that, in FIG. 2, the idle mode measurement activity is shown to be triggered earlier than the SDT procedure. However, the sequence of the idle mode measurement activity and the SDT procedure is not limited in the present disclosure. In some implementations, the SDT procedure may be triggered earlier than the idle mode measurement activity.

In some implementations, a UE may stop a running first timer (e.g., T330) if the UE is implementing an SDT procedure. In other words, the UE may stop/postpone/suspend the logged measurement activity during the SDT procedure. During a logged measurement activity, the UE may firstly receive a logged measurement configuration from the serving RAN of the UE, which may include an initial value (e.g., loggingDuration) of the first timer (e.g., T330). After receiving the logged measurement configuration from the serving RAN, the UE may configure the first timer (e.g., T330) in the UE side (e.g., in the RRC entity of the UE) by setting the initial value of the first timer (e.g., T330) (e.g., as the received loggingDuration). Then, the UE may start to implement logged measurement and start to count the first timer (e.g., T330) to zero. The UE may maintain the logged measurement activity while the first timer (e.g., T330) is counting.

In some implementations, after the running first timer (e.g., T330) is counted to zero, the UE may stop the logged measurement activity and release the stored logged measurement configuration.

In some implementations, after the running first timer (e.g., T330) is counted to zero, the logged measurement results measured by the UE during the logged measurement activity may still be kept by the UE, and then the UE may report to the serving RAN next time while the UE re-connects to the serving RAN.

In some implementations, the UE may re-start and recount the stopped or expired first timer (e.g., T330), which may be stopped by the UE while the SDT procedure is initiated, after the SDT procedure terminates.

In some implementations, the UE may keep counting the first timer (e.g., T330) even during an SDT procedure (e.g., CG-SDT or RA-SDT procedure). In some implementations, the UE may keep implementing the logged measurement activity even during an SDT procedure. In some other implementations, the UE may stop implementing the logged measurement activity even the first timer (T330) is counting during the SDT procedure.

It should be noted that, in some implementations, the first timer (e.g., T330) may be counted to zero during an SDT procedure, and then the UE may release the stored logged measurement configuration during the SDT procedure. However, in this case, the UE may still keep the stored logged measurement results even the logged measurement configuration is released (e.g., during the SDT procedure).

In some implementations, the UE may stop performing the logging measurement during the SDT procedure (which may include the subsequent data exchange during the SDT procedure) if the first timer (e.g., T330) is stopped. In some implementations, the logging measurement may not be impacted by the active SDT procedure (and the subsequent data exchange during the SDT procedure); therefore, the first timer (e.g., T330) may be still counting during the SDT procedure.

In some implementations, the loggingDuration may be re-configured by the serving cell during an SDT procedure (e.g., by receiving an updated LoggedMeasurementConfiguration). In this case, the UE may stop the existing counting first timer (e.g., T330) immediately (if it is running) once after receiving the updated LoggedMeasurementConfiguration. Then, the UE may re-start the first timer (e.g., T330) by setting an initial value thereof based on the configured loggingDuration in the updated LoggedMeasurementConfiguration. In this case, the first timer (e.g., T330) may be (re)started during an SDT procedure and the UE may keep counting it without being impacted by the SDT procedure. In other words, the UE may implement the logged measurement based on the (updated) LoggedMeasurementConfiguration without being impacted by the SDT procedure.

In some implementations, the UE may receive an updated LoggedMeasurementConfiguration during an SDT procedure. In this case, the UE may (re)start to count the first timer (e.g., T330) by, for example, re-configuring the initial value=loggingDuration, only after the SDT procedure is terminated. In this case, the UE may not implement the logged measurement based on the (updated) LoggedMeasurementConfiguration until (or unless) the SDT procedure is terminated. In other words, the UE may restart the first timer (e.g., T330) and apply the updated logged measurement configuration after the SDT procedure is terminated. It is noted that, in some implementations, the UE may not be configured with any logged measurement configuration before the UE initiates the SDT procedure, and the UE may receive a first logged measurement configuration during the SDT procedure.

In some implementations, the UE may stop a running second timer (e.g., T331) if the UE is implementing the SDT procedure.

In some implementations, the UE may re-start and recount the stopped second timer (e.g., T331) after the SDT procedure terminates.

In some implementations, the UE may keep counting the second timer (e.g., T331) even during an SDT procedure (e.g., CG-SDT or RA-SDT procedure).

In some implementations, the UE may also stop performing the idle/inactive measurement during the SDT procedure (which may include the subsequent data exchange during the SDT procedure) if the second timer (e.g., T331) is stopped (e.g., during the SDT procedure).

In some implementations, the UE may also stop performing the idle/inactive measurement during the SDT procedure (which may include the subsequent data exchange during the SDT procedure) when the second timer (e.g., T331) is still counting (e.g., during the SDT procedure). In some implementations, the activated idle/inactive measurement activity may not be impacted by the active SDT procedure (and the subsequent data exchange during the SDT procedure) and the second timer (e.g., T331) may be still running during the SDT procedure.

In some implementations, the UE may receive an updated idle/inactive measurement configuration during an SDT procedure. In this case, the UE may (re)start to count the second timer (e.g., T331) by, for example, re-configuring the initial value based on the updated idle/inactive measurement configuration, only after the SDT procedure is terminated. In this case, the UE may not implement the idle/inactive measurement based on the (updated) idle/inactive measurement configuration until (or unless) the SDT procedure is terminated. In other words, the UE may restart the second timer (e.g., T331) and apply the updated idle/inactive measurement configuration after the SDT procedure is terminated. It is noted that, in some implementations, the UE may not be configured with any idle/inactive measurement configuration before the UE initiates the SDT procedure, and the UE may receive a first idle/inactive measurement configuration during the SDT procedure.

In some implementations, an SDT procedure may be considered terminated while the UE receives a specific RRC message (e.g., RRCSetup message, RRCResume message, RRCRe-establishment message, etc.) from the serving RAN to terminate the running SDT procedure, or while the SDT failure (detection) timer associated with the running SDT procedure is counted to zero.

SRB1/SRB2 Enhancements

The SRB1/SRB2 signaling enhancements during an SDT procedure are described below. Some DL/UL control signaling may be transmitted via SRB1/SRB2 and it is observed that the SRB1/SRB2 may be resumed during an SDT procedure. The DL/UL control signaling which may be (or may not be) transmitted during an SDT procedure is also discussed.

In some implementations, a UE may be allowed to transmit a specific RRC/NAS signaling to the serving RAN via the SRB1/SRB2 automatically/implicitly (e.g., being pre-defined in technical specification) during an SDT procedure (e.g., while the UE is still staying in the RRC inactive state and the configured SDT failure detection timer is still running/active).

In some implementations, the serving RAN (e.g., serving cell/camped cell/selected cell/anchor cell of the UE) may be allowed/enabled to transmit at least one specific RRC/NAS signaling to the UE via the SRB1/SRB2 automatically/implicitly (e.g., being pre-defined in technical specification) during an SDT procedure (e.g., while the UE is still staying in the RRC inactive state and the configured SDT failure detection timer is still running/active).

In some implementations, the UE may receive explicit control signaling (e.g., UE-specific RRC signaling) from its serving RAN to enable/allow/configure the UE to transmit one or more specific signaling even while the SRB1/SRB2 is resumed for the SDT procedure.

In some implementations, the specific RRC/NAS signaling may include, but not be limited to, any combination of a CounterCheck message, a CounterCheckResponse message, a DLInformationTransfer message, a ULInformationTransfer message, a FailureInformation message, an IABOtherInformation message, a LocationMeasurementIndication message, a LoggedMeasurementConfiguration message, an RRCreconfiguration message, an RRCReconfigurationComplete message, a SecurityModeCommand message, a UEAssistanceInformation message, a UeinformationRequest message, a UeinformationResponse message, and a DedicatedSIBRequest message.

It is noted that some of the specific RRC/NAS signaling above may be transmitted only via the SRB1, some of the specific RRC/NAS signaling above may be transmitted only via the SRB2, and some of the specific RRC/NAS signaling above may be transmitted via the SRB1 and SRB2.

In some implementations, the serving cell may configure a specific indicator to allow a specific radio bearer (e.g., SRB2allowed=true) to be resumed/activated during the small data transmission procedure. For example, once the SRB2 is allowed, the signaling associated with SRB2 (e.g., the signaling which is transmitted via SRB2) may be implicitly allowed to be transmitted during the SDT procedure. In some implementations, the serving cell may explicitly indicate which signaling is allowed for SDT and which signaling is not.

In some implementations, the SRB1 may be implicitly/directly allowed to be resumed/activated for SDT if at least the SRB2 or any DRB is activated for SDT. For example, once the SRB1 is allowed (implicitly/directly), the signaling associated SRB1 (e.g., the signaling which can be transmitted via SRB1) may be implicitly allowed to be transmitted during the SDT procedure. In some implementations, the serving cell may explicitly indicate which signaling is allowed for SDT and which signaling is not.

In some implementations, the UE may not be allowed or may be disabled/disallowed/configured not to transmit the specific RRC/NAS signaling to the serving RAN via the SRB1/SRB2 automatically/implicitly (e.g., being pre-defined in technical specification) during the SDT procedure (e.g., while the UE is still staying in the RRC inactive state, and the configured SDT failure detection timer is still running/active).

In some implementations, the serving RAN (e.g., serving cell/camped cell/selected cell/anchor cell of the UE) may not be allowed or may be disabled/disallowed to transmit the specific RRC/NAS signaling to the UE via the SRB1/SRB2 automatically/implicitly (e.g., being pre-defined in technical specification) during the SDT procedure (e.g., while the UE is still staying in the RRC inactive state and the configured SDT failure detection timer is still running/active). In other words, the UE may not expect to receive the specific RRC/NAS signaling (which is disabled to be transmitted during the active SDT procedure) during the SDT procedure.

In some implementations, the UE may receive explicit control signaling (e.g., UE-specific RRC signaling) from its serving RAN to disable/disallow the UE to transmit one or more specific signaling even while the SRB1/SRB2 is resumed for the SDT procedure.

In some implementations, the UE may be configured (e.g., via explicit signaling, such as the RRCReconfiguration message or the RRCRelease message, or within the SDT configuration) to be allowed/disallowed (or to be enabled/disabled) to transmit the specific RRC/NAS signaling to the serving RAN via the SRB1/SRB2 during the SDT procedure (e.g., while the UE is still staying in the RRC inactive state and the configured SDT failure detection timer is still running/active).

In some implementations, the serving RAN (e.g., serving cell/camped cell/selected cell/anchor cell of the UE) may transmit one or more DL control signaling to enable/disable (or allow/disallow) the UE to transmit a specific RRC/NAS signaling to the serving RAN via the SRB1/SRB2 during the SDT procedure (e.g., while the UE is still staying in the RRC inactive state and the configured SDT failure detection timer is still running/active). In some implementations, the DL control signaling to enable/allow/disable/disallow the specific RRC/NAS signaling exchange during the SDT procedure may be transmitted by the serving Cell via broadcasting system information or via UE-specific RRC signaling (e.g., RRCRelease message or RRCReconfiguration message) or within the SDT configuration.

In some implementations, during the SDT procedure, the UE may only transmit the RRC/NAS signaling which is enabled/allowed to be exchanged during the SDT procedure by the serving RAN. In other words, the UE may not expect to receive the specific RRC/NAS signaling (which is disabled/disallowed to be transmitted during the active SDT procedure) during the SDT procedure.

Regarding the default configuration, in some implementations, a specific RRC/NAS signaling may be associated with a default setting about whether the specific RRC/NAS signaling is allowed/disallowed/enabled/disabled to be exchanged during the SDT procedure. Before the UE receives the DL control signaling to enable/allow/disable/disallow the specific RRC/NAS signaling exchange during the SDT procedure, the UE may decide whether to transmit the specific RRC/NAS signaling based on the default setting. In some implementations, the source of the default setting (for one or more specific RRC/NAS signaling) may include at least one of: 1) a pre-installation in the memory module or USIM in the UE side, 2) a currently stored (e.g., RRC/SDT) configuration which the UE has received while the UE is still staying in the RRC connected state, or 3) broadcasting system information.

In some implementations, the UE may be configured/enabled/allowed to transmit the RRC/NAS signaling to the anchor cell (e.g., the serving cell which (re)configures the SDT configuration) only. In some implementations, the anchor cell/BS of a UE may be the cell/BS which stores the UE's inactive context/AS security and maintains the UE's connection with the core network (e.g., N1 interface).

In some implementations, the UE may not be allowed/triggered/configured to transmit the RRC/NAS signaling with a non-anchor cell. That is, an RRC/NAS signaling may not be transmitted by a UE to its serving cell while the serving cell is a non-anchor cell to the UE. In some implementations, the UE may not resume the SRB2 with the serving cell (e.g., during the SDT procedure) while the serving cell is not the anchor cell to the UE.

In some implementations, the UE may be pre-defined (e.g., in the 3GPP technical specification) about which UL control signaling could be transmitted by the UE (e.g., via the resumed SRB1/SRB2) during an SDT procedure while the SRB1/SRB2 is resumed for the SDT procedure.

In some implementations, the UE may be (pre-)configured (e.g., via explicit signaling/explicit configuration from the serving RAN) about which UL control signaling could be transmitted by the UE (via the resumed SRB1/SRB2) during an SDT procedure while the SRB1/SRB2 is resumed for the SDT procedure. In some implementations, the UE may be further (pre-)configured about which procedures that the UE/serving cell could initiate during the SDT procedure.

In some implementations, the RRC/NAS signaling exchange procedure triggered by the UE or by the serving RAN/serving CN of the UE during a running SDT procedure may be interrupted by an SDT failure event (which is described below). In some implementations, the pending RRC/NAS message in the UE side may be released with an SDT failure condition (e.g., the MAC buffer associated with the SRB1/SRB2 may be flushed/dropped/released after the SDT failure event is announced/considered by the UE). In some implementations, the pending RRC/NAS message may be re-transmitted by the UE after the SDT failure event happens (e.g., the UE may start a non-SDT procedure, such as an RRC resume procedure, to request to move to the RRC connected state after the SDT failure event. Then, the UE may (re)transmit the pending RRC/NAS message after the UE moves to the RRC connected state). In some implementations, the UE may re-start another SDT procedure to re-transmit the pending RRC/NAS message to the serving RAN/CN again.

In some implementations, the RRC/NAS signaling exchange procedure triggered by the UE or by the serving RAN/serving CN of the UE during a running SDT procedure may be interrupted by at least one fallback event (which is described below) before the UE transmits any pending RRC/NAS message to the serving cell (e.g., when the UE receives a fallback instruction from the serving cell or the UE initiates a fallback mechanism automatically). In some implementations, the pending RRC/NAS message may be released with the SDT fallback condition (e.g., the MAC buffer associated with the SRB1/SRB2 may be flushed/dropped/released after the SDT fallback event is announced/considered by the UE). In some implementations, the pending RRC/NAS message may be re-transmitted by the UE after the SDT fallback event happens (e.g., the UE may fall back to a non-SDT procedure, such as an RRC resume procedure, to request to move to the RRC connected state after the SDT fallback event. Then, the UE may (re)transmit the pending RRC/NAS message after the UE moves to the RRC connected state). In some implementations, the UE may fall back to another SDT procedure (e.g., from a failed CG-SDT procedure to an RA-SDT procedure), and then the UE may re-transmit the pending RRC/NAS message to the serving RAN/CN again. It is noted that the pending RRC/NAS signaling may be an initial Hybrid Automatic Repeat reQuest (HARQ) transmission or a HARQ re-transmission in the HARQ protocols.

In some implementations, the network (e.g., a radio access network and/or a core network) may transmit one or more CounterCheck messages to indicate the current COUNT Most Significant Bit (MSB) values associated with each Data Radio Bearer (DRB), to request the UE to compare these to its COUNT MSB values, and to report the comparison results to the network.

In some implementations, during the SDT procedure, the DRB in the CounterCheck message may only include the Radio Bearers (e.g., DRB(s)/SRB(s)) which are configured/enabled/allowed to be activated/resumed in an SDT procedure; therefore, only the pending data in these DRB(s)/SRB(s) or logical channels associated with these DRB(s) may be exchanged during the SDT procedure. In other words, the DRB(s)/SRB(s) which are not allowed/enabled for data exchange during SDT procedures may not be included in the CounterCheck message while the CounterCheck message is transmitted during an SDT procedure.

In some implementations, the DRB(s)/SRB(s) not configured/activated/resumed for SDT may be considered to be unused (e.g., by assuming the COUNT value as "0") in the CounterCheck message (e.g., transmitted by the serving Cell) and/or in the CounterCheckResponse message.

In some implementations, the DRB(s)/SRB(s) not configured/activated/resumed for SDT may not be indicated by the serving cell in the CounterCheck message. In this case, the UE may not need to reply with the COUNT value of these DRBs in the CounterCheckResponse message.

In some implementations, the CounterCheck message indicated during the SDT procedure may include all of the DRB(s)/SRB(s) configured in the UE side (e.g., no matter whether the DRB/SRB is activated/de-activated/resumed/suspended) during the SDT procedure.

After receiving the CounterCheck message from the serving cell during an SDT procedure or during the subsequent DL/UL data exchange phase within the SDT procedure, the UE may reply with a CounterCheckResponse message to the serving cell.

In some implementations, the CounterCheck message delivered during the SDT procedure may still cover all of the DRB(s)/SRB(s) configured in the UE side (e.g., no matter whether the DRB/SRB is suspended or activated/resumed for SDT), which means that the COUNT value of all of the DRBs/SRBs in the UE side may be indicated by the serving cell.

In some implementations, the CounterCheckResponse message delivered during the SDT procedure may also cover at least one DRB/SRB configured in the UE side (e.g., no matter whether the DRB/SRB is suspended or activated/resumed for SDT). In some implementations, the UE may reply with the COUNT value (stored in the UE side)

associated with a DRB/SRB while the MSBs of the COUNT value stored in the UE side associated with one DRB/SRB (which is activated/resumed by the UE during the SDT procedure) is different from the value indicated by the serving RAN via the CounterCheck message (to the same DRB/SRB). In some implementations, the UE may reply with the COUNT value of a DRB/SRB no matter whether the DRB/SRB is suspended or activated/resumed during the SDT procedure, which means that the UE may check the COUNT value of a suspended DRB during the counter checking procedure initiated by the serving cell during an SDT procedure.

In some implementations, in response to the Counter-Check message, for each DRB/SRB that is included in the drb-CountMSB-InfoList in the CounterCheck message and that is not established by the UE, the UE may include the DRB/SRB in the drb-CountInfoList in the CounterCheck-Response message by including the drbIdentity, the count-Uplink, and the count-Downlink with the MSBs set identical to the corresponding values in the drb-CountMSB InfoList and the least significant bits (LSBs) set to zero.

In some implementations, the counter check procedure may be interrupted by an SDT failure event. For example, the SDT failure detection timer may be stopped before the UE transmits the CounterCheckResponse message to the serving cell. In some implementations, the pending CounterCheckResponse message may be released with the SDT failure condition (e.g., the MAC buffer associated with the SRB1/SRB2 may be flushed/dropped/released after the SDT failure event is announced/considered by the UE). In some implementations, the pending CounterCheckResponse message may be re-transmitted by the UE after the SDT failure event happens (e.g., the UE may start a non-SDT procedure, such as an RRC resume procedure, to request to move to the RRC connected state after the SDT failure event. Then, the UE may (re)transmit the CounterCheckResponse message after the UE moves to the RRC connected state). In some implementations, the UE may re-start another SDT procedure to re-transmit the CounterCheckResponse message to the serving RAN/CN again.

In some implementations, the counter check procedure may be interrupted by the fallback mechanism while a fallback event happens before the UE transmits the CounterCheckReponse message to the serving cell (e.g., when the UE receives a fallback instruction from the serving cell or the UE initiates a fall back mechanism automatically). In some implementations, the pending CounterCheckResponse message may be released with the SDT fallback condition (e.g., the MAC buffer associated with the SRB1/SRB2 may be flushed/dropped/released after the SDT fallback event is announced/considered by the UE). In some implementations, the pending CounterCheckResponse message may be re-transmitted by the UE after the SDT fallback event happens (e.g., the UE may fall back to a non-SDT procedure, such as an RRC resume procedure, to request to move to the RRC connected state after the SDT fallback event. Then, the UE may (re)transmit the CounterCheckResponse message after the UE moves to the RRC connected state). In some implementations, the UE may fall back to another SDT procedure (e.g., from a failed CG-SDT procedure to an RA-SDT procedure), and then the UE may re-transmit the CounterCheckResponse message to the serving RAN/CN again.

The DLInformationTransfer message is used for the downlink transfer of NAS dedicated information and timing information for the 5G internal system clock.

The DLInformationTransfer may be transmitted via an SRB2 or an SRB1 (only if the SRB2 is not established yet or the SRB2 is not resumed for SDT).

In some implementations, if the SRB2 is not configured (to be activated/resumed) for SDT (e.g., SRB2 is not established or not resumed for SDT), the serving cell may not be allowed to transmit the NAS signaling during the SDT procedure, and/or the UE may not expect a NAS signaling exchange during the SDT procedure. In some implementations, the UE may still be allowed to transmit the NAS signaling via the SRB1 if only SRB1 is configured to be activated for SDT (and SRB2 is not established or is not resumed for SDT).

In some implementations, if the SRB2 is configured (to be activated/resumed) for SDT, the serving cell may transmit the DLInformationTransfer message to the UE only via the SRB2 during the SDT procedure.

The ULInformationTransfer message is used for the uplink transfer of NAS or non-3GPP dedicated information. In some implementations, the UE may only be allowed/enabled/configured to transmit the NAS signaling during an SDT procedure. In contrast, the UE may not be allowed/enabled/configured to transmit non-3GPP dedicated information during the SDT procedure.

The ULInformationTransfer may be transmitted via an SRB2 or an SRB1 (only if SRB2 is not established yet or the SRB2 is not resumed for SDT).

In some implementations, if the SRB2 is not configured (to be activated/resumed) for SDT (e.g., SRB2 is not established or the SRB2 is suspended and not resumed for SDT), the UE may not be allowed to transmit the NAS signaling to the serving RAN during the SDT procedure, and/or the UE may not expect a NAS signaling exchange during the SDT procedure. In some implementations, the UE may still be allowed to transmit the NAS signaling via the SRB1 if only SRB1 is configured to be activated for SDT (e.g., no active/resumed SRB2 for SDT).

In some implementations, if the SRB2 is configured (to be activated/resumed) for SDT, then the UE may transmit the ULInformationTransfer message to the serving cell only via the SRB2 during the SDT procedure.

The FailureInformation message is used to inform the network about a failure detected by the UE. During an SDT procedure, the FailureInformation may be transmitted by the UE (to the serving RAN) only via an SRB1.

The IABOtherInformation message is used by Integrated Access and Backhaul-Mobile Termination (IAB-MT), which initiates an SDT procedure to request the network to allocate IP addresses for the collocated Integrated Access and Backhaul-Distributed Unit (IAB-DU) or to inform the network about IP addresses allocated to the collocated IAB-DU. In some implementations, an IAB-MT may be enabled/configured to transmit an IABOtherInformation message via an SRB1 while the IAB-MT initiates an SDT procedure.

During an SDT procedure, the IABOtherInformation message may be transmitted by the UE (e.g., to the serving RAN) only via the SRB1.

In some implementations, a UE (e.g., an IAB-MT) may not be allowed or may be disabled to transmit the IABOtherInformation message to the serving RAN.

In some implementations, the UE may either start or stop location-related measurement which requires measurement gaps.

In some implementations, the UE may not transmit LocationMeasurementIndication to the serving cell (e.g., via the resumed SRB1) during the SDT procedure (during the SDT procedure and the subsequent data transmission/reception procedure happens during the same SDT procedure).

In some implementations, the UE may transmit Location-MeasurementIndication message (e.g., via the resumed SRB1) to inform that the UE may not be able to implement the following subsequent data exchange during the SDT procedure. In some implementations, the UE may transmit the LocationMeasurementIndication message to indicate that the UE may not be able to access one or more uplink configured grants for CG-SDT procedure for a time period, which may be presented by the IE LocationMeasurementInfo in the LocationMeasurementIndication message.

An example of the LocationMeasurementIndication message (based on 3GPP TS 38.331) is shown in Table 1.

TABLE 1

```
LocationMeasurementIndication ::= SEQUENCE {
criticalExtensions CHOICE {
locationMeasurementIndication LocationMeasurementIndication-Ies,
criticalExtensionsFuture SEQUENCE { }
    }
  }
LocationMeasurementIndication-Ies ::= SEQUENCE {
measurementIndication SetupRelease {LocationMeasurementInfo},
lateNonCriticalExtension OCTET STRING OPTIONAL,
nonCriticalExtension SEQUENCE{ } OPTIONAL
}
```

The LoggedMeasurementConfiguration message is used to configure the UE to perform logging of measurement results while the UE is staying in the RRC idle state or the RRC inactive state. The LoggedMeasurementConfiguration message is used to transfer the logged measurement configuration for network performance optimization.

In some implementations, the serving cell may transmit the LoggedMeasurementConfiguration message to the UE (e.g., via the resumed SRB1) during the SDT procedure (e.g., during the subsequent DL packet transmission before the CG-SDT/RA-SDT procedure is terminated).

After receiving the LoggedMeasurementConfiguration configuration, the UE may configure/update/modify/release its own stored logged measurement configuration based on the received LoggedMeasurementConfiguration.

In some implementations, after the running SDT procedure is finished/terminated, the UE may (start to) implement the logged measurement based on the received LoggedMeasurementConfiguration.

In some implementations, the UE may update the stored LoggedMeasurementConfiguration directly after receiving the updated LoggedMeasurementConfiguration configuration during the SDT procedure. In addition, the UE may be triggered to implement logged measurement immediately.

In some implementations, the UE may not expect the network to transmit the LocationMeasurementIndication message to the UE during the SDT procedure.

An example of the LocationMeasurementIndication message (based on 3GPP TS 38.331) is shown in Table 2.

TABLE 2

```
LoggedMeasurementConfiguration-r16 ::= SEQUENCE {
criticalExtensions CHOICE {
loggedMeasurementConfiguration-r16
LoggedMeasurementConfiguration-r16-Ies,
criticalExtensionsFuture SEQUENCE { }
  }
}
LoggedMeasurementConfiguration-r16-Ies ::= SEQUENCE {
traceReference-r16 TraceReference-r16,
```

TABLE 2-continued

```
traceRecordingSessionRef-r16 OCTET STRING (SIZE (2)),
tce-Id-r16 OCTET STRING (SIZE (1)),
absoluteTimeInfo-r16 AbsoluteTimeInfo-r16,
areaConfiguration-r16 AreaConfiguration-r16 OPTIONAL, --Need R
plmn-IdentityList-r16 PLMN-IdentityList2-r16 OPTIONAL, --Need R
bt-NameList-r16 SetupRelease {BT-NameList-r16}
OPTIONAL, --Need M
wlan-NameList-r16 SetupRelease {WLAN-NameList-r16}
OPTIONAL, --Need M
sensor-NameList-r16 SetupRelease {Sensor-NameList-r16}
OPTIONAL, --Need M
loggingDuration-r16 LoggingDuration-r16,
reportType CHOICE {
periodical LoggedPeriodicalReportConfig-r16,
eventTriggered LoggedEventTriggerConfig-r16,
...
},
lateNonCriticalExtension OCTET STRING OPTIONAL,
nonCriticalExtension SEQUENCE { } OPTIONAL
}
LoggedPeriodicalReportConfig-r16 ::= SEQUENCE {
loggingInterval-r16 LoggingInterval-r16,
...
}
LoggedEventTriggerConfig-r16 ::= SEQUENCE {
eventType-r16 EventType-r16,
loggingInterval-r16 LoggingInterval-r16,
...
}
EventType-r16 ::= CHOICE {
outOfCoverage NULL,
eventL1 SEQUENCE {
l1-Threshold MeasTriggerQuantity,
hysteresis Hysteresis,
timeToTrigger TimeToTrigger
},
...
}
```

In some implementations, the serving cell may transmit one or more RRCReconfiguration messages during the SDT procedure, which re-configures the UE context (e.g., UE inactive context stored in the UE side) and/or SDT configuration/idle or inactive mode packet transmission configuration during the SDT procedure. After the UE receives the RRCReconfiguration message, the UE may reply with an RRCReconfigurationComplete message to the serving cell (e.g., during the same SDT procedure) if the UE could comply/implement all of the received instructions in the received RRCReconfiguration message without error.

In some implementations, an RRC Reconfiguration Failure event may happen if the UE could not implement any part of instructions (or Ies) in the RRCReconfiguration message.

Under this RRC Reconfiguration Failure condition, in some implementations, the UE may keep the UE's original configuration (e.g., original SDT configuration and/or original UE inactive AS context) and then reply with an RRCReconfigurationFailure message to the serving cell. In this case, the SDT procedure may still be active, all the running timers (associated with the SDT procedure) may be still counting/active, and the pending UL data/(AS/NAS) control signaling may still be kept in the buffer without being impacted by the (RRC) Reconfiguration Failure event. In some cases, the UE may still stay in the RRC inactive state when the RRC Reconfiguration Failure event happens during an SDT procedure.

Under this RRC Reconfiguration Failure condition, in some implementations, the UE may not reply the RRCReconfigurationFailure message to the UE. In some cases, the UE may move to the RRC idle state. Then, the UE may initiate one random access procedure to transmit an RRCSetupRequest message to the serving cell (e.g., via MSGA/MSG3 delivery during a 2-step/4-step random access procedure to try to connect with the serving RAN again). Therefore, the running SDT procedure may be interrupted by the RRC Reconfiguration Failure event. In this scenario, the RRC Reconfiguration Failure event may be considered as one event for the UE to trigger an SDT failure event.

In some implementations, after moving to the RRC idle state, the stored SDT configuration and UE inactive AS context may be cleared/released/dropped.

In some implementations, the UE may not reply the RRCReconfigurationFailure message to the UE. In some cases, the UE may stay in the RRC inactive state, but the SDT procedure may also be interrupted by the Reconfiguration Failure event. Then, the UE may initiate a random access procedure to transmit an RRCResumeRequest message to the serving cell (e.g., to try to resume its RRC connection with the serving RAN again based on the stored UE inactive AS context).

In some implementations, the UE may stay in the RRC inactive state, but the SDT procedure may also be interrupted by the Reconfiguration Failure event. Then, the UE may initiate a random access procedure to transmit an RRCRe-establishmentRequest message to the serving cell (e.g., via MSGA or MSG3 during a 2-step/4-step RA procedure to try to re-establish its RRC connection with the serving RAN again based on the stored UE inactive AS context).

In some implementations, the UE may modify/update/release all or a subset of the stored UE inactive context based on the received RRCReconfiguration message. In some implementations, the UE may modify/update the stored SDT configuration/idle or inactive mode packet transmission configuration based on the received RRCReconfiguration message.

In some implementations, only the SDT configuration could be re-configured by the serving cell while an RRCReconfiguration message is transmitted during an SDT procedure. In other words, the serving cell may not be able to modify/update/release all or a subset of stored UE inactive context by transmitting the RRCReconfiguration message during the SDT procedure.

In some implementations, an RRC Reconfiguration procedure trigged during an SDT procedure may be interrupted by an SDT failure event. For example, the SDT failure detection timer may expire or may be stopped before the UE transmits the RRCReconfigurationComplete message to the serving cell. In some implementations, the UE may consider the interruption event as one of the RRC Reconfiguration Failure events, and then the UE may apply at least one of the proposed mechanisms about the RRC Reconfiguration Failure event.

In some implementations, the RRC Reconfiguration procedure may be interrupted by the fallback mechanism while a fallback event happens before the UE transmits the RRCReconfigurationComplete message to the serving cell (e.g., the UE receives a fallback instruction from the serving cell or the UE initiates a fallback mechanism automatically). In some implementations, the UE may consider the fallback event as one of the RRC Reconfiguration Failure events, and then the UE may apply at least one of the proposed mechanisms about the RRC Reconfiguration Failure event.

In some implementations, the network may not transmit a SecurityModeCommand message to the UE during an SDT procedure.

In some implementations, the network may transmit the SecurityModeCommand message to the UE during the SDT procedure (e.g., while only SRB1 is resumed during the SDT procedure, but the network may want to (re)configure the following SRB2/DRB(s) during the SDT procedure).

If the UE receives a SecurityModeCommand message during the SDT procedure, the UE may start to derive AS security keys (e.g., based on the Section 5.3.4.3 in TS 38.331 v16.5.0). Then, the UE may reply with a SecurityModeComplete message or a SecurityModeFailure message also during the SDT procedure. In some implementations, the UE may consider that the SDT procedure fails and may move to the RRC idle state if a Security Mode Failure event happens.

Under the Security Mode Failure condition, in some implementations, the UE may keep the UE's original configuration (e.g., UE may continue using the stored NAS/AS security configuration used prior to the reception of the SecurityModeCommand message) and then reply with a SecurityModeFailure message to the serving cell. In this case, the SDT procedure may still be active, all the running timers associated with the SDT procedure) may be still counting/active, and the pending UL data/(AS/NAS) control signaling may still be kept in the buffer without being impacted by the Security Mode Failure event. In some cases, the UE may still stay in the RRC inactive state when the Security Mode Failure event happens during an SDT procedure.

Under the Security Mode Failure condition, in some implementations, the UE may not reply with the SecurityModeFailure message to the serving cell. In some cases, the UE may move to the RRC idle state. Then, the UE may initiate a random access procedure to transmit an RRCSetupRequest message to the serving cell (e.g., via MSGA/MSG3 delivery during a 2-step/4-step random access procedure to try to connect with the serving RAN again). In this case, the running SDT procedure is interrupted by the Security Mode Failure event. In this scenario, the Security Mode Failure event may be considered as an event for the UE to trigger the SDT failure event.

It is noted that, after moving to the RRC idle state, the stored SDT configuration (e.g., which may include the stored AS/NAS security configuration) and UE inactive AS context may be cleared/released/dropped.

In some implementations, the UE may not reply with the SecurityModeFailure message to the serving cell. In some cases, the UE may stay in the RRC inactive state, but the SDT procedure may also be interrupted by the Security Mode Failure event. Then, the UE may initiate a random access procedure to transmit an RRCResumeRequest message to the serving cell (e.g., to try to resume its RRC connection with the serving RAN again based on the stored UE inactive AS context).

In some implementations, the UE may stay in the RRC inactive state, but the SDT procedure may also be interrupted by the Security Mode Failure event. Then, the UE may initiate a random access procedure to transmit an RRCRe-establishmentRequest message to the serving cell (e.g., via MSGA or MSG3 during a 2-step/4-step RA procedure to try to re-establish its RRC connection with the serving RAN again based on the stored UE inactive AS context).

In some implementations, the Security Mode Command procedure trigged during an SDT procedure may be interrupted by an SDT failure event. For example, the SDT failure detection timer may be stopped before the UE transmits the SecurityModeComplete message to the serving cell. In some implementations, the UE may consider the interruption event as a Security Mode Failure event and then the UE may apply at least one of the proposed mechanisms about the Security Mode Failure event.

In some implementations, the Security Mode Command procedure may be interrupted by a fallback mechanism while a fallback event happens before the UE transmits the SecurityModeComplete message to the serving cell (e.g., the UE receives a fallback instruction from the serving cell, or the UE initiates a fallback mechanism automatically). In some implementations, the UE may consider the fallback event as a Security Mode Failure event, and then the UE may apply at least one of the proposed mechanisms about the Security Mode Failure event.

The SidelinkUEinformationNR message is used for the indication of NR sidelink UE information to the network, and the SidelinkUEinformationEUTRA message is used for the indication of E-UTRA sidelink UE information to the network.

In some implementations, the UE may transmit the SidelinkUEinformationNR message during the SDT procedure (e.g., via the resumed SRB1).

In some implementations, the UE may not be allowed to transmit the SidelinkUEinformationNR message during the SDT procedure. In other words, the UE may be allowed to transmit the SidelinkUEinformationNR message only while the UE is staying in the RRC connected state.

It is noted that the proposed mechanisms about the SidelinkUEinformationNR message may also be applicable to the SidelinkUEinformationEUTRA message.

The UEAssistanceInformation message is used for the indication of UE assistance information to the network.

In some implementations, the UE may transmit the SidelinkUEinformationNR message during the SDT procedure (e.g., via the resumed SRB1) in the UEAssistanceInformation message. In some examples, the UE may transmit a ReleasePreference message (e.g., by configuring the preferredRRC-state-idle) in the UEAssistanceInformation message.

In some implementations, the UE may transmit in-device coexistence (IDC) information (idc-assistance information) in the UEAssistanceInformation message to solve the IDC issue (e.g., caused by the SDT procedure). It is noted that the UE may transmit the UEAssistanceInformation message to the serving cell during the SDT procedure only while the UE receives the RRCReconfiguration message from the serving cell during the same SDT procedure.

In some implementations, the UE may not be allowed (or configured) to transmit the UEAssistanceInformation message during the SDT procedure. In other words, the UE may be allowed to transmit the UEAssistanceInformation message only while the UE is staying in the RRC connected state.

In some implementations, the serving cell may transmit a UEInformationRequest message to the UE to report during the SDT procedure.

After receiving the UEInformationRequest message from the serving cell (e.g., during a CG-SDT/RA-SDT procedure), the UE may reply with a UEInformationResponse message to the serving cell also during the same SDT procedure.

In some implementations, the serving cell may transmit an indicator (e.g., idleModeMeasurementReq={true}) in the UEInformationRequest message. Then, after receiving the idleModeMeasurementReq message, the UE may reply with an available 'measResultIdleEUTRA' and/or 'measResuldIdleNR' in the VarMeasIdleReport, which may be transmitted by the UE within the UEInformationResponse message.

In some implementations, the serving cell may transmit an indicator (e.g., logMeasReportReq={true}) in the UeinformationRequest message. Then, after receiving the logMeasReportReq message, the UE may implement the following implementations:

1> if the logMeasReportReq is present and if the Registered Public Land Mobile Network (RPLMN) is included in plmn-IdentityList stored in VarLogMeasReport:
2> if VarLogMeasReport includes one or more logged measurement entries, set the contents of the logMeasReport in the UEInformationResponse message as follows:
3> include the absoluteTimeStamp and set it to the value of absoluteTimeInfo in the VarLogMeasReport;
4> include the traceReference and set it to the value of traceReference in the VarLogMeasReport;
3> include the traceRecordingSessionRef and set it to the value of traceRecordingSessionRef in the VarLogMeasReport;
3> include the tce-Id and set it to the value of tce-Id in the VarLogMeasReport;
3> include the logMeasInfoList and set it to include one or more entries from the VarLogMeasReport starting from the entries logged first, and for each entry of the logMeasInfoList that is included, include all information stored in the corresponding logMeasInfoList entry in the VarLogMeasReport;
3> if the VarLogMeasReport includes one or more additional logged measurement entries that are not included in the logMeasInfoList within the UEInformationResponse message:
4> include the logMeasAvailable;
4> if bt-LocationInfo is included in locationInfo of one or more of the additional logged measurement entries in the VarLogMeasReport that are not included in the logMeasInfoList within the UEInformationResponse message:
5> include the logMeasAvailableBT;
4> if wlan-LocationInfo is included in locationInfo of one or more of the additional logged measurement entries in the VarLogMeasReport that are not included in the logMeasInfoList within the UEInformationResponse message:
5> include the logMeasAvailableWLAN.

In some implementations, the serving cell may transmit an indicator (e.g., ra-ReportReq={true}) in the UEInformationRequest message. Then, after receiving the ra-ReportReq message, the UE may implement the following implementations:

1> if ra-ReportReq is set to true and the UE has random access related information available in the VarRA-Report and if the RPLMN is included in plmn-IdentityList stored in the VarRA-Report:
2> set the ra-ReportList in the UEInformationResponse message to the value of ra-ReportList in the VarRA-Report;
2> discard the ra-ReportList from the VarRA-Report upon successful delivery of the UEInformationResponse message confirmed by lower layers.

In some implementations, the UE may record the failed random access procedures which are triggered for RA-SDT procedures in the VarRA-Report (e.g., stored in the ra-ReportList within the VarRA-Report).

In some implementations, the serving cell may transmit an indicator (e.g., rlf-ReportReq={true}) in the UEInformationRequest message. Then, after receiving the rlf-ReportReq message, the UE may implement the following:
1> if rlf-ReportReq is set to true:
2> if the UE has radio link failure information or handover failure information available in the VarRLF-Report and if the RPLMN is included in plmn-IdentityList stored in the VarRLF-Report:
3> set timeSinceFailure in the VarRLF-Report to the time that elapsed since the last radio link failure or handover failure in NR;
3> set the rlf-Report in the UEInformationResponse message to the value of the rlf-Report in the VarRLF-Report;
3> discard the rlf-Report from the VarRLF-Report upon successful delivery of the UEInformationResponse message confirmed by lower layers.

In some implementations, the UE may record the radio link failure (RLF) event happens during the running CG-SDT/RA-SDT procedure and/or previous SDT procedures. For example, the UE may record the RLF event while the (e.g., Automatic Repeat request (ARQ)) re-transmissions within an RLC entity reaches the pre-defined maximum number during an SDT procedure. In some cases, the UE may also record the beam failure recovery failure event happens during an SDT procedure. In some cases, the UE may also record the T310 expiry event while: 1) a T310 is started upon detecting physical layer problems for the serving cell during the SDT procedure (e.g., upon receiving N310 consecutive out-of-sync indications from the lower layers during a CG-SDT/RA-SDT procedure), then 2) the T310 expires (e.g., during the SDT procedure), and a radio link failure event may be decided by the UE.

In some implementations, the serving cell may transmit an indicator (e.g., connEstFailReportReq={true}) in the UEInformationRequest message. Then, after receiving the connEstFailReportReq message, the UE may implement the following:
1> if connEstFailReportReq is set to true and the UE has connection establishment failure information or connection resume failure information in the VarConnEstFailReport and if the RPLMN is equal to plmn-Identity stored in the VarConnEstFailReport:
2> set timeSinceFailure in the VarConnEstFailReport to the time that elapsed since the last connection establishment failure or connection resume failure in NR;
2> set the connEstFailReport in the UEInformationResponse message to the value of connEstFailReport in the VarConnEstFailReport;
2> discard the connEstFailReport from the VarConnEstFailReport upon successful delivery of the UEInformationResponse message confirmed by lower layers.

In some implementations, the serving cell may transmit an indicator (e.g., mobilityHistoryReportReq={true}) in the UEInformationRequest message. Then, after receiving the mobilityHistoryReportReq message, the UE may implement the following:
1> if the mobilityHistoryReportReq is set to true:
2> include the mobilityHistoryReport and set it to include entries from the VarMobilityHistoryReport;
2> include in the mobilityHistoryReport an entry for the current cell, possibly after removing the oldest entry if required, and set its fields as follows:
3> set visitedCellId to the global cell identity or the physical cell identity and carrier frequency of the current cell;
3> set field timeSpent to the time spent in the current cell.

It is noted that, if the logMeasReport is included in the UEInformationResponse message, the UE may transmit the UEInformationResponse message only via the SRB2. In other words, during the SDT procedure, the UE may not transmit the UEInformationResponse message with the logMeasReport if the SRB2 is not resumed by the UE (e.g., based on the SDT configuration from the serving cell) for the SDT procedure. In some implementations, the serving cell may not request the logMeasReport during an SDT procedure if the SRB2 is not resumed during the SDT procedure. That is, the serving cell may request the logMeasReport during an SDT procedure only while the SRB2 is resumed to the UE. The UE may not expect the serving cell to request the logMeasReport during an SDT procedure if the SRB2 is not resumed. In other words, the UE may report the logMeasReport only after the UE moves back to the RRC connected state (e.g., based on the request/enquiry procedure instructed by the serving cell of the UE).

In some implementations, the UE may transmit the UEInformationResponse message via the SRB1 if the logMeasReport is included in the UEInformationResponse message. In some implementations, the UE may not transmit the logMeasReport within the UEInformationResponse message with other Ies if only the SRB1 is resumed at the UE side. In some cases, the UE may transmit the UEInformationResponse message but with empty data if only the logMeasReport is requested by the serving cell but the SRB2 is not resumed for the SDT procedure. In some cases, the UE may ignore/skip the UEInformationResponse message transmission if only the logMeasReport is requested by the serving cell but the SRB2 is not resumed for the SDT procedure.

In some implementations, the UE may be allowed/enabled/configured to transmit a DedicatedSIBRequest message during an SDT procedure (e.g., during a CG-SDT procedure/RA-SDT procedure).

In addition, the UE may configure a timer (e.g., T350) and count the timer (e.g., T350) to zero upon the UE transmits the DedicatedSIBRequest message with the requestedSIB-List and/or the requestedPosSIB-List. In some implementations, the timer (e.g., T350) may be stopped if the running SDT failure detection timer associated with the active SDT procedure expires. In some implementations, the timer (e.g., T350) may be stopped if the UE implements an SDT fallback mechanism (e.g., after receiving an SDT fallback instruction from the serving cell during an SDT procedure). In some implementations, the timer (e.g., T350) may be stopped if the SDT procedure is interrupted (e.g., when the UE re-selects to another cell during the SDT procedure). In some implementations, the timer (e.g., T350) may be stopped if the running SDT procedure is terminated (e.g., after the UE receives an RRCRelease message from the serving cell to terminate the running SDT procedure).

In some implementations, the UE may be (pre-)configured/defined with a threshold for the maximum number of the DedicatedSIBRequest transmissions for an SDT procedure. For example, in a case that the UE is (pre)configured/(pre)defined with a maximum DedicatedSIBRequest transmission number of one, the UE may transmit at most one DedicatedSIBRequest message during one SDT procedure. In some implementations, the UE may set an accumulated number of the DedicatedSIBRequest transmissions (for an SDT procedure) to zero every time an SDT procedure is initiated, and the UE may be allowed to transmit the DedicatedSIBRequest message to the serving cell during the SDT procedure while the accumulated DedicatedSIBRequest transmission number is still under the threshold. The UE may add the accumulated number of the DedicatedSIBRequest transmissions by 1 every time when a DedicatedSIBRequest message is transmitted during the SDT procedure. The UE may not be allowed to transmit the DedicatedSIBRequest message in the SDT procedure anymore while the accumulated number of the DedicatedSIBRequest transmission reaches (or is more than) the given threshold.

In some cases (e.g., the threshold of maximum DedicatedSIBRequest message transmission number is set to 1), the UE may not start the timer (e.g., T350) after the UE transmits the DedicatedSIBRequest message during the SDT procedure. After the running SDT procedure is terminated/fallback, the UE may re-set the accumulated number of the DedicatedSIBRequest transmission to zero and as such the UE may be able to transmit the DedicatedSIBRequest message to the serving RAN again in the next SDT procedure.

In some implementations, the UE may not transmit the DedicatedSIBRequest message during an SDT procedure, and UE may not be allowed/enabled to transmit the DedicatedSIBRequest message during the SDT procedure. In some implementations, the UE may be (pre-)configured/defined not to transmit the DedicatedSIBRequest message during an SDT procedure. In some implementations, the UE may be limited to deliver the DedicatedSIBRequest message only for a specific purpose (e.g., only for Positioning SIB (PosSIB) or only for one or more specific SIBs).

After receiving the DedicatedSIBRequest message during an SDT procedure, the serving cell may transmit any combinations of the requested SIB(s) during the same SDT procedure via a UE-specific DL control signaling (e.g., a DL-RRC signaling).

It is noted that, in some implementations, the DedicatedSIBRequest procedure (e.g., trigged during an SDT procedure) may be interrupted by an SDT failure event. For example, the SDT failure detection timer may be stopped after the UE transmits the DedicatedSIBRequest message to the serving cell. In some implementations, the running timer (e.g., T350) may be stopped with the SDT failure event.

In some implementations, the DedicatedSIBRequest procedure may be interrupted by a fallback mechanism while a fallback event happens after the UE transmits the DedicatedSIBRequest message to the serving cell (e.g., the UE receives a fallback instruction from the serving cell, or the UE initiates a fallback mechanism automatically). In some implementations, the running timer (e.g., T350) may be stopped with the SDT fallback event.

In some implementations, the UE may not transmit MeasurementReport to the serving cell (e.g., via the resumed SRB1) during an SDT procedure.

In some implementations, the UE may not transmit SCGFailureInformation/SCGFailureInformationEUTRA to the serving cell (e.g., via the resumed SRB1) during an SDT procedure.

In some implementations, the UE may not expect the serving cell to transmit MobilityFromNRCommand to the UE (e.g., via the resumed SRB1) during an SDT procedure.

In some implementations, the UE may not expect the serving cell to transmit a UECapabilityEnquiry message to the UE (e.g., via the resumed SRB1) during an SDT procedure.

In some implementations, the UE may ignore an unintended DL signaling (e.g., DL signaling that the UE does not expect the serving cell would transmit during an SDT procedure).

In some implementations, the UE may consider an RRC connection failure event happens. After an RRC connection failure event is identified by the UE, in some implementations, the UE may initiate an RRC re-establishment procedure (e.g., by transmitting an RRC(Connection)Re-establishmentRequest message to the serving cell during an initiated 2-step/4-step random access procedure). In some implementations, the UE may move to the RRC idle state and initiate an RRC establishment procedure (e.g., by transmitting an RRC(Connection)SetupRequest message to the serving cell during an initiated 2-step/4-step random access procedure).

In some implementations, the stored UE inactive context may be modified based on the UE-specific DL control signaling transmitted by the serving cell.

In some implementations, the RRC/NAS signaling described above may also be exchanged between base stations in the serving RAN (e.g., via inter-node signaling). For example, the UE may be configured with an SDT configuration from an anchor cell/BS (e.g., Cell #1/BS #1, which instructs the UE to move to the RRC inactive state via an RRCRelease message and also enables the UE to implement SDT procedures during the RRC inactive state), then the UE may re-select another serving cell due to an idle mode mobility event (e.g., cell (re)selection procedure). Then, the UE may initiate an SDT procedure with the serving cell/BS (e.g., Cell #2/BS #2). In this case, the UE may additionally exchange any one of the indicated RRC/NAS signaling via SRB1/SRB2 (e.g., which may be resumed for the SDT procedure) within the airlink between the UE and the serving cell/BS (e.g., the Cell #2/BS #2). Then, the serving cell/BS may forward/translate the decoded/un-decoded/received RRC/NAS signaling to the anchor cell/BS.

In some implementations, the anchor cell/BS (e.g., Cell #1/BS #1) may also generate one or more RRC/NAS signaling for the concerned UE and then deliver the generated signaling to the serving cell/BS via (wired/wireless) backhaul connections. In this case, the serving cell/BS may forward/relay the RRC/NAS signaling generated by the anchor cell/BS (e.g., Cell #1/BS #1) to the UE during the SDT procedure.

It is noted that, in some implementations, the anchor cell/B S may be a New Radio (NR) cell (or an NR base station, such as gNB). In some implementations, the anchor cell/BS may be an E-UTRA cell (or an E-UTRA base station, such as eNB). In some implementations, the serving cell/BS may be an NR Cell (or an NR base station, such as gNB). In some implementations, the serving cell/BS may be an E-UTRA cell (or an E-UTRA base station, such as eNB). Therefore, the backhaul connections between the serving cell/BS and the anchor cell/BS may be an X2 interface/Xn interface/Integrated Access and Backhaul (IAB) connection. In some implementations, the core network (or at least one entity in the core network, such as Access and Mobility Management Function (AMF)) may involve in the RRC/NAS signaling exchange between the serving cell/BS and the anchor cell/BS.

In some implementations, one cell may broadcast (e.g., via broadcasting system information, such as SIB1 and/or other SIB) whether the cell supports SRB2 to be resumed during the SDT procedure (e.g., the cell/BS may broadcast that SRB2allowedforSDT=true/allowed or false/notallowed in SIB1). In some implementations, SRB2 may not be allowed to be resumed for SDT by default; therefore, the cell/BS needs to deliver explicit signaling to further announce that SRB2allowedforSDT=true/allowed to the cell.

However, in some implementations, different neighbor cells may configure UEs differently with regards to whether SRB2 is allowed for SDT or not, and it may have an impact on the UE. For example, the UE may have an active SDT procedure with a first cell, then an SDT failure event may happen (e.g., the UE re-selects to a second cell due to cell re-selection procedure). In this case, the UE may be triggered to re-start another SDT procedure with the second cell. However, the UE may have at least one pending Transport Block/packet which has multiplexed packets from DRB/SRB1 and SRB2, but the second cell may not support SRB2 resumption for SDT.

To solve this issue, in some implementations, the UE may start an RRC resume procedure rather than an SDT procedure, if there is any pending data of SRB2 (e.g., the pending data is received from the logical channel associated with SRB2) multiplexed with the data from other logical channels in the UE's buffer. In some implementations, the UE may drop/release/remove the pending Transport Blocks which have multiplexed data from SRB2 (or the UE may drop/release/remove all of the pending TBs, or the UE may move to the RRC idle state) if the mismatch condition (e.g., whether the SRB2 is allowed for SDT or not) happens between the last serving cell and the current serving cell.

In some implementations, another mismatch that the first cell does not support SRB2 resumption for SDT, but the second cell supports it may not cause an issue for the UE/RAN.

It is noted that the mismatch condition may also happen in the same cell (e.g., the UE is implementing a unified access control (UAC) mechanism for the SDT procedure, and the UE is still barred from performing SDT during a backoff time period. However, the serving cell of the UE may modify the IE SRB2allowedforSDT during the backoff period before the UE starts a CG-SDT/RA-SDT procedure on the airlink). For example, the cell/BS may modify the IE semi-persistently (e.g., change the SRB2allowedforSDT from 'true/allowed' to 'false/notallowed', or vice versa) when a concerned UE is going to start an SDT procedure, or when an SDT procedure is ongoing, or when the UE wants to re-start a failed/interrupted SDT procedure with the same serving cell.

To solve this issue, in some implementations, when an active SDT procedure is ongoing, the UE may ignore (e.g., not to decode) the IE SRB2allowedforSDT and keep the SDT procedure active even if the IE has been modified by the serving cell. In some implementations, the SDT attempt is temporally barred, and the UE may start an RRC resume procedure (or an RRC establishment procedure), rather than an SDT procedure, with the same serving cell (after the cell re-configures the SRB2allowedforSDT from 'true' to 'false') if there is any pending data of SRB2 multiplexed with the data from other logical channels in the UE's buffer. In some implementations, the UE may drop/release/remove the pending Transport Blocks which have multiplexed data from SRB2 (or the UE may drop/release/remove all of the pending TBs, or the UE may move to the RRC idle state) if the serving cell changes the IE of whether the SRB2 is allowed for SDT or not before the UE triggers an SDT procedure (e.g., via an MSGA/MSG1 delivery or via a UL-CG access). It is noted that the proposed mechanism about the SRB2 IE modification on the serving cell/neighbor cell may not be limited to the SRB2 change scenario but may also be applicable to other scenarios that the serving cell/neighbor changes any part of broadcasting SDT configuration while an SDT procedure is active/barred/waiting to be (re)started. The SDT configuration may be, for example, a CG-SDT configuration and/or an RA-SDT configuration.

Several control mechanisms about DL/UL control signaling delivery approaches while SRB1 and/or SRB2 are resumed during an SDT procedure/idle mode packet transmission procedure are described. It is noted that the proposed mechanisms may not be limited by 3GPP NR specifications but may also be applicable to other RATs (e.g., 3GPP Long Term Evolution (LTE) protocols, Narrow Band Internet-of-Things (NB-IoT), Machine Type Communication, evolved Machine Type Communication (eMTC), Wi-Fi, Bluetooth).

Small Data Transmission During an RRC Inactive State

NR supports the RRC inactive state and UEs with infrequent (periodic and/or non-periodic) data transmission are generally maintained by the network in the RRC inactive state. Until Rel-16, the RRC inactive state doesn't support data transmission. Hence, the UE has to resume the connection (e.g., move to the RRC connected state) for any DL reception and/or UL data transmission. Connection setup and subsequent releasing to the RRC inactive state happen for each data transmission regardless of how small and infrequent the data packets are. This results in unnecessary power consumption and signaling overhead.

Signaling overhead due to transmission of small data packets is a general problem and will become a critical issue as the number of UEs increase in NR, not only for network performance and efficiency, but also for UE battery performance. In general, any device that has intermittent small data packets in an inactive state will benefit from enabling small data transmission in the inactive state.

The key enablers for small data transmission in NR, namely the INACTIVE state, 2-step, 4-step RACH, and configured grant type-1 have already been specified as part of legacy. So, this work builds on these building blocks to enable small data transmission in the INACTIVE state for NR.

RRC inactive state (e.g., RRC_INACTIVE) is a state where a UE remains in Connection Management (CM)-Connected and can move within an area configured by NG-RAN (the RNA) without notifying NG-RAN. In the RRC inactive state, the last serving gNB node keeps the UE context and the UE-associated NG connection with the serving AMF and UPF.

The RRC inactive state may support at least one of the following functions: PLMN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (both Control/User (C/U)-planes) established for UE, the UE AS context stored in NG-RAN and the UE, NG-RAN knows the RNA which the UE belongs to, and/or, etc.

For NR connected to 5GC, the UE identity "I-RNTI" may be used to identify the UE context in the RRC inactive state. The I-RNTI provides the new NG-RAN node a reference to the UE context in the old NG-RAN node. How the new NG-RAN node is able to resolve the old NG-RAN ID from the I-RNTI is a matter of proper configuration in the old and new NG-RAN node. Some typical partitioning of a 40 bit I-RNTI assumes the following contents:

UE-specific reference: reference to the UE context within a logical NG-RAN node;

NG-RAN node address index: information to identify the NG-RAN node that has allocated the UE-specific part;

PLMN-specific information: information supporting network sharing deployments, providing an index to the PLMN ID part of the Global NG-RAN node identifier;

SNPN-specific information: SNPN may be a small PLMN configured by the operator. Each SNPN may be identified by a unique SNPN identity (e.g., an identifier of an SNPN including a PLMN ID and an NID combination). A configured grant configuration may be associated with an SNPN ID.

UE Inactive AS Context is stored when the connection is suspended (e.g., when the UE is in the RRC inactive state) and restored when the connection is resumed (e.g., when the UE is transited from the RRC inactive state to the RRC connected state).

Figure 3:
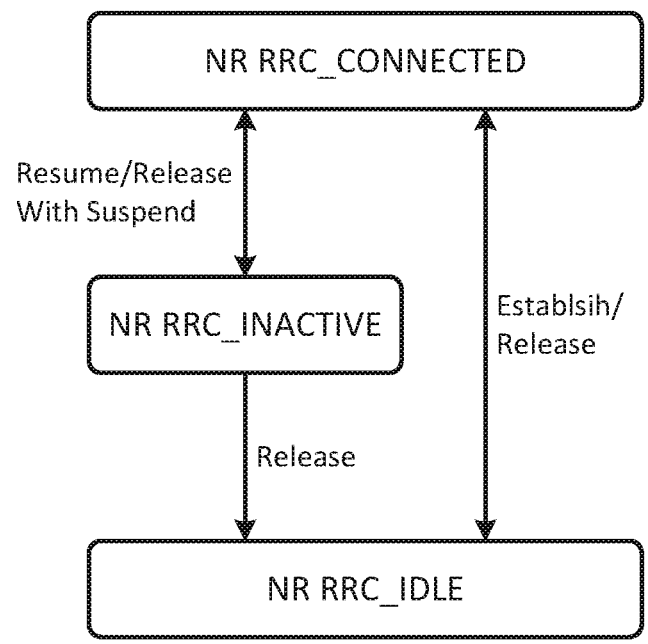
FIG. 3 is a state diagram illustrating a state machine in new radio (NR) according to an example implementation of the present disclosure.

FIG. 3 is a state diagram illustrating a state machine in NR according to an example implementation of the present disclosure. A UE has only one RRC state in NR at one time.

Referring to FIG. 3, the suspension of the RRC connection is initiated by the network. When the RRC connection is suspended, the UE in the RRC connected state (e.g., RRC_CONNECTED) stores the UE Inactive AS context and configurations received from the network, and transits to the RRC inactive state. If the UE is configured with an SCG, the UE may release the SCG configuration upon initiating an RRC connection resume procedure. The RRC message to suspend the RRC connection is integrity protected and ciphered. The resumption of a suspended RRC connection is initiated by upper layers when the UE needs to transit from the RRC inactive state to the RRC connected state, or by RRC layer to perform an RNA update or by RAN paging from NG-RAN. When the RRC connection is resumed, the network may configure the UE according to the RRC connection resume procedure based on the stored UE Inactive AS context and the RRC configuration received from the network. The RRC connection resume procedure re-activates AS security and re-establishes SRB(s) and DRB(s).

In response to a request to resume the RRC connection, the network may resume the suspended RRC connection and send the UE to the RRC connected state, or reject the resume request and send the UE to the RRC inactive state with a wait timer, or directly re-suspend the RRC connection and send the UE to the RRC inactive state, or directly release the RRC connection and send the UE to the RRC idle state (e.g., RRC IDLE), or instruct the UE to initiate NAS-level recovery (in this case, the network may send an RRC setup message).

In addition, in the RRC inactive state, a UE-specific DRX may be configured by upper layers or by an RRC layer, a UE-controlled mobility is based on network configuration, the UE stores the UE Inactive AS context, and a RAN-based notification area is configured by an RRC layer. Furthermore, the UE may perform the following behaviors in the RRC inactive state:

Monitor Short Messages transmitted with Paging RNTI (P-RNTI) over DCI;

Monitor a Paging channel for CN paging using 5G-S-TMSI and RAN paging using full Inactive RNTI (fullI-RNTI);

Perform neighboring cell measurements and cell (re-)selection;

Perform RAN-based notification area updates periodically and when moving outside the configured RAN-based notification area; and Acquire system information and can send SI requests (if configured).

Figure 4:
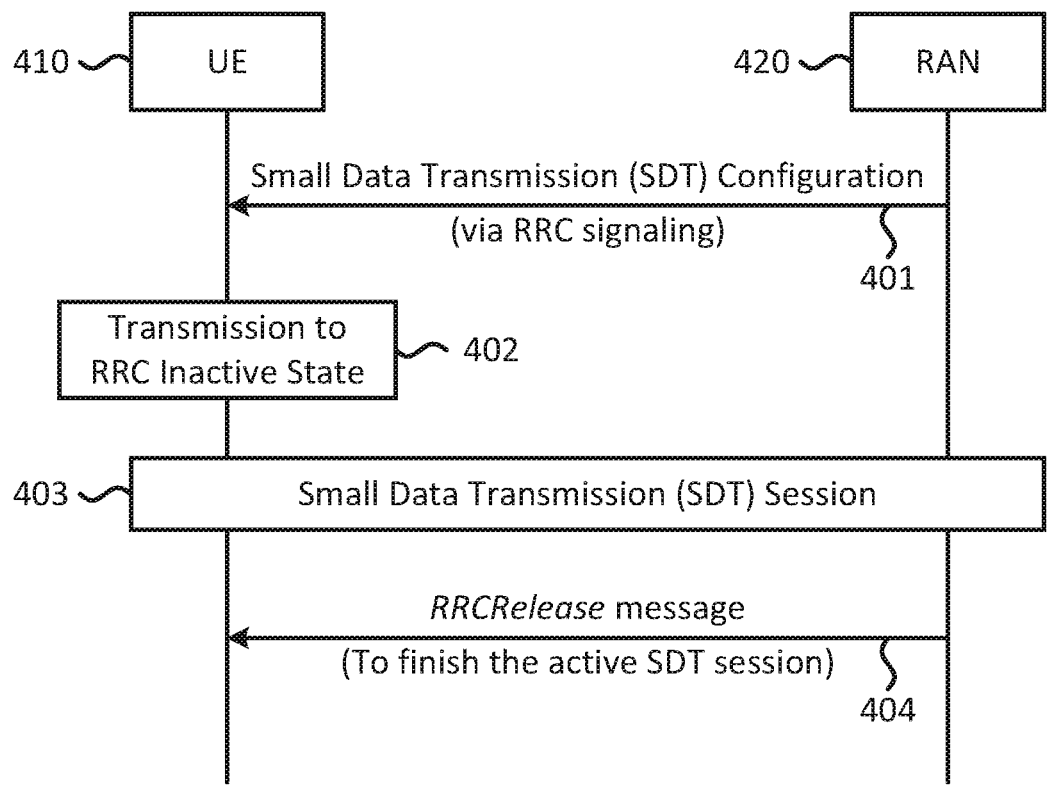
FIG. 4 is a communication diagram illustrating an SDT procedure according to an example implementation of the present disclosure.

FIG. 4 is a communication diagram illustrating an SDT procedure according to an example implementation of the present disclosure.

Referring to FIG. 4, in action 401, the UE 410 may receive an SDT configuration via DL UE-specific signaling (e.g., an RRCReconfiguration message and/or an RRCRelease message) from the serving radio access network (RAN) 420, such as a first serving cell associated with the UE 410. The first serving cell (which is part of the serving RAN 420) may configure a UL-CG configuration (or CG-PUSCH resource configurations) and/or (UE-specific/common (or cell-specific)) Random access resources for the UE 410 to implement SDT after the UE 410 moves to the RRC inactive state later on (which will be described below). In some implementations, the CG-PUSCH resource and/or the RA resource configuration may locate on a normal uplink carrier (e.g., UL carrier or NUL carrier) and/or a supplementary uplink carrier (e.g., SUL carrier).

It is noted that, in some implementations, in action 401, the UE 410 may receive a (cell-specific/common) SDT configuration via broadcasting system information (e.g., for an RA-SDT configuration) from its serving cell, which belongs to the serving RAN 420.

After receiving the SDT configuration while the UE 410 is staying in the RRC connected state, in action 402, the UE 410 may store the SDT configuration after the UE 410 moves to the RRC inactive state (e.g., after receiving the RRCRelease message from the first serving cell, where the RRCRelease message instructs the UE to move to the RRC inactive state). While some packets (e.g., belonging to the SDT radio bearers, which may also be configured in the SDT configuration) arrive, the UE 410 may start an SDT session accordingly (e.g., by transmitting the encoded packets on the configured UL-CG configuration directly with or without transmitting the RRCResumeRequest message, or by transmitting a preamble first with or without attaching encoded packet during a 2-step RA procedure triggered as part of the SDT session, or by transmitting a preamble as MSG1 and the following RRCResumeRequest message/encoded packet in a 4-step RA procedure) with a second serving cell (which also belong to the same serving RAN 420). It is noted that the second serving cell may be the same as the first serving cell in some scenarios, and the second serving cell may be different from the first serving cell in some other scenarios.

After the UE 410 initiates the SDT session, the serving cell (e.g., the first serving cell or the second serving cell) may continue the SDT by transmitting DL packets to the UE 410 or providing dynamic UL grants to the UE 410 for the subsequent DL/UL packet exchange phase in action 403. It is noted that HARQ protocols may be configured as part of the SDT configuration and be implemented in the DL/UL packet exchange phase during the SDT session.

In order to finish the active SDT session, in action 404, the second serving cell may transmit a second RRCRelease message to instruct the UE 410 to finish the SDT session. In some implementations, the UE 410 may keep the stored SDT configuration and stay in the RRC inactive state after receiving the second RRCRelease message to finish the active SDT session.

Uplink Configured Grant Configurations for SDT and CG-SDT Procedure

In the uplink, the gNB (e.g., part of the serving RAN 420 shown in FIG. 4) may dynamically allocate resources to UEs (e.g., UE 410 shown in FIG. 4) via the Cell RNTI (C-RNTI) on PDCCH(s). A UE may always monitor the PDCCH(s) in order to find possible grants for uplink transmission when its downlink reception is enabled (activity governed by DRX when configured). When CA is configured, the same C-RNTI may apply to all serving cells.

In addition, with Configured Grants, the gNB may allocate uplink resources for the initial HARQ transmissions to the UEs. Two types of configured uplink grants are defined:

Type 1: RRC (e.g., an RRC layer/RRC entity of the serving cell in the RAN 420 shown in FIG. 4) may directly provide the configured uplink grant (including the periodicity); and Type 2: RRC (e.g., an RRC layer/RRC entity of the serving cell in the RAN 420 shown in FIG. 4) may define the periodicity of the configured uplink grant while PDCCH addressed to Configured Scheduling RNTI (CS-RNTI) can either signal and activate the configured uplink grant, or deactivate it. For example, a PDCCH addressed to CS-RNTI may indicate that the uplink grant can be implicitly reused according to the periodicity defined by RRC, until deactivated.

Type 1 and Type 2 are configured by RRC per-serving-cell and per-BWP. Multiple configurations can be active simultaneously only on different serving cells. For Type 2, activation and deactivation are independent among the serving cells. For the same serving cell, the MAC entity is configured with either Type 1 or Type 2.

RRC may configure the following parameters when the configured grant Type 1 is configured:
cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength (e.g., SLIV in TS 38.214); and
nrofHARQ-Processes: the number of HARQ processes for configured grant.

Upon configuration of a configured grant Type 1 for a serving cell by upper layers, the MAC entity shall:
1> store the uplink grant provided by upper layers as a configured uplink grant for the indicated serving cell;
1> initialize or re-initialize the configured uplink grant to start in the symbol according to timeDomainOffset and S (derived from SLIV as specified in TS 38.214), and to reoccur with periodicity.

RA Procedure, RA Resource Configurations for SDT and RA-SDT Procedure

Based on the 3GPP technical specifications, two types of RA procedure are supported:
4-step RA type (with MSG1); and
2-step RA type (with MSGA).

Both types of RA procedure support contention-based random access (CBRA) and contention-free random access (CFRA).

The UE may select the type of RA at initiation of the RA procedure based on the following network configuration:
when CFRA resources are not configured, an RSRP threshold is used by the UE to select between 2-step RA type and 4-step RA type;
when CFRA resources for 4-step RA type are configured, UE performs random access with 4-step RA type; and
when CFRA resources for 2-step RA type are configured, UE performs random access with 2-step RA type.

The network may not configure CFRA resources for 4-step and 2-step RA types at the same time for a Bandwidth Part (BWP). CFRA with 2-step RA type is only supported for handover.

The MSGA of the 2-step RA type may include a preamble on a PRACH and a payload on a PUSCH. After the MSGA transmission, the UE may monitor a response from the network within a configured window.

For CFRA, upon receiving the network response, the UE may end the RA procedure.

For CBRA, if contention resolution is successful upon receiving the network response, the UE may end the RA procedure. If a fallback indication is received in an MSGB, the UE may perform an MSG3 transmission and monitor contention resolution. If contention resolution is not successful after the MSG3 (re)transmission(s), the UE may go back to the MSGA transmission.

If the RA procedure with 2-step RA type is not completed after a number of MSGA transmissions, the UE may be configured to switch to the CBRA with 4-step RA type.

For random access in a cell configured with SUL, the network may explicitly signal which carrier to use (e.g., UL or SUL). Otherwise, the UE may select the SUL carrier if and only if the measured quality of the DL is lower than a broadcast threshold. The UE may perform carrier selection before selecting between 2-step and 4-step RA type. The RSRP threshold for selecting between 2-step and 4-step RA type may be configured separately for the UL and the SUL. Once the RA-SDT procedure is started, all uplink transmissions of the RA procedure remain on the selected carrier.

When CA is configured, the RA procedure with 2-step RA type may only be performed on a Pcell while the contention resolution can be cross-scheduled by the Pcell.

When CA is configured, for the RA procedure with 4-step RA type, the first three steps of CBRA may always occur on the Pcell while the contention resolution (step 4) can be cross-scheduled by the Pcell. The three steps of a CFRA started on the Pcell remain on the Pcell. CFRA on an S cell can only be initiated by the gNB to establish timing advance for a secondary Timing Advance Group (TAG): the procedure is initiated by the gNB with a PDCCH order (step 0) that is sent on a scheduling cell of an activated Scell of the secondary TAG, preamble transmission (step 1) takes place on the indicated Scell, and Random Access Response (step 2) takes place on a Pcell.

During an RA-SDT procedure, the UE may transmit the pending data in MSG1/MSG3 or the following successive UL packets during a 4-step RA procedure (which may be ended after receiving an RRCRelease message from the serving RAN to finish the active SDT procedure).

During an RA-SDT procedure, the UE may transmit the pending data in MSGA and the following UL packets during a 2-step RA procedure (which may be ended after receiving an RRCRelease message from the serving RAN to finish the active SDT procedure).

Figure 5:
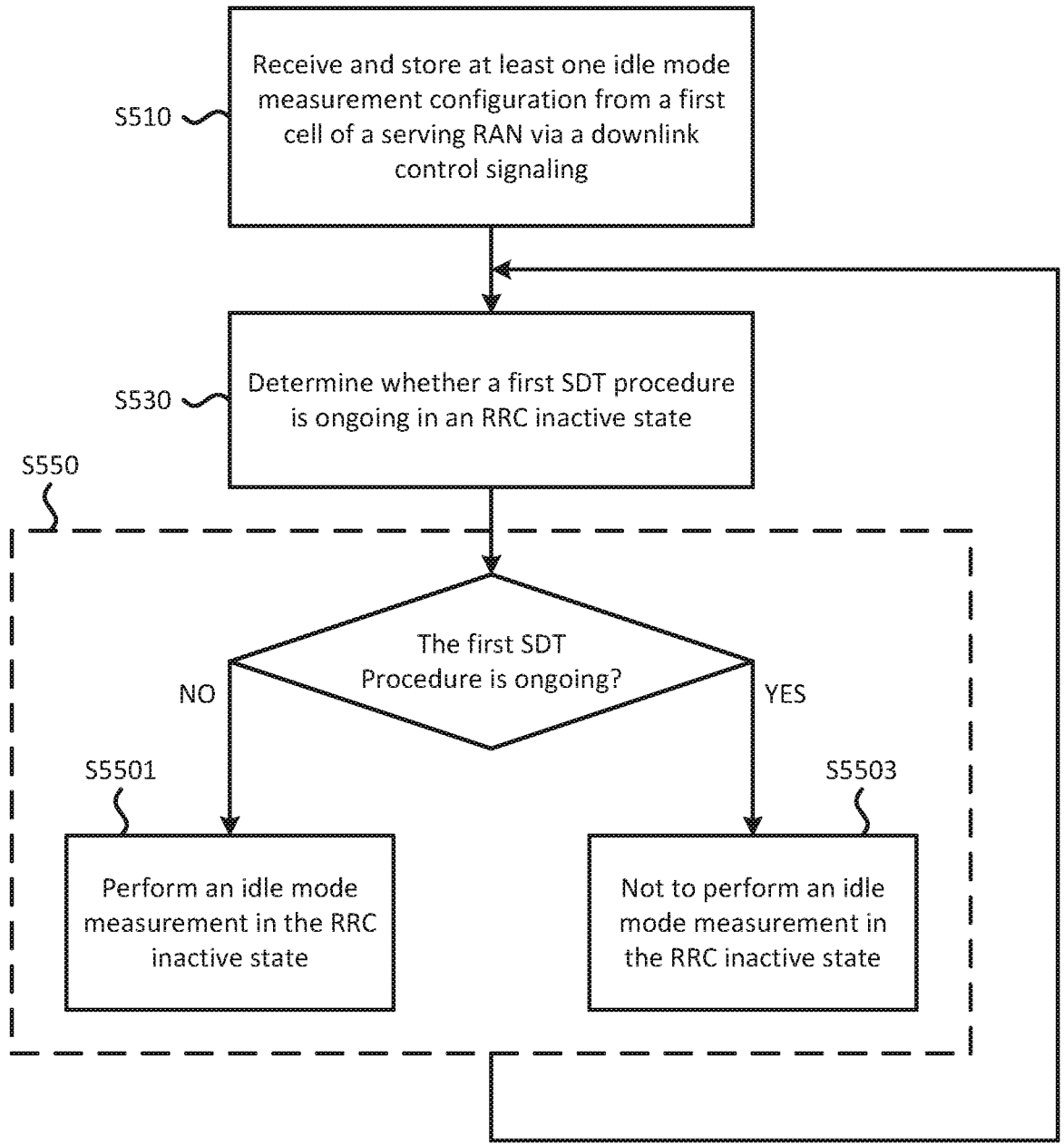
FIG. 5 is a flowchart illustrating a method for performing an idle mode measurement in a radio resource control (RRC) inactive state according to an example implementation of the present disclosure.

FIG. 5 is a flowchart illustrating a method for performing an idle mode measurement in an RRC inactive state according to an example implementation of the present disclosure.

The method described with reference to FIG. 5 is performed by a UE. Several terms, configurations, operations, mechanisms, progress, and conceptions described in the previous descriptions are not repeated when describing the method. It is noted that each SDT procedure described with reference to FIG. 5 may be an RA-SDT procedure or a CG-SDT procedure.

Referring to FIG. 5, in action S510, the UE may receive at least one idle mode measurement configuration from a first cell of a serving RAN via downlink control signaling and store the received at least one idle mode measurement configuration.

In some implementations, the one or more idle mode measurement configurations may be received while the UE is staying in an RRC connected state via downlink control signaling (e.g., DL-RRC signaling or broadcasting system information, such as SIB1 or other SI). In some implementations, the one or more idle mode measurement configurations may be received while the UE is staying in an RRC inactive state via the downlink control signaling. The downlink control signaling may be, for example, an RRC message, such as an RRCRelease message or broadcasting system information, but which is not limited herein.

The one or more idle mode measurement configurations may include, for example, at least one of an idle/inactive measurement configuration or a logged measurement configuration, but which is not limited herein.

In some implementations, the one or more idle measurement configurations may include a measurement duration. Upon receiving and storing the one or more idle measurement configurations, the UE may set an initial value of an idle mode measurement timer (e.g., T330, T331, etc.) based on the measurement duration and start to count the idle mode measurement timer to zero. In a case that the idle mode measurement timer expires, the UE may release the stored one or more idle measurement configurations.

In some implementations, after receiving the one or more idle mode measurement configurations, the UE may transit/stay in the RRC inactive state due to various reasons. For example, the UE may transit/stay in the RRC inactive state due to a received RRCRelease message with SuspendConfig from the serving RAN, but which is not limited herein.

Referring to FIG. 5, in action S530, the UE staying in the RRC inactive state may determine whether a first SDT procedure is ongoing. In action S550, the UE staying in the RRC inactive state may determine whether to perform an idle mode measurement (e.g., according to the received idle mode measurement configuration) based on a determination result of action S530.

Specifically, in a case that the first SDT procedure is determined to be not ongoing in action S530, the UE may determine to perform the idle mode measurement and perform the idle mode measurement in the RRC inactive state in action S5501; in a case that the first SDT procedure is determined to be ongoing in action S530, the UE may determine not to perform the idle mode measurement in the RRC inactive state in action S5503.

In some implementations, the UE may determine whether the first SDT procedure is ongoing based on whether an SDT failure detection timer (e.g., T319a) is counting. Specifically, the SDT failure detection timer may be started by the UE upon an SDT procedure being initiated, and stopped by the UE upon the SDT procedure being terminated. Therefore, the UE may determine whether the first SDT procedure is ongoing by checking whether the SDT failure detection timer is counting. In a case that the UE finds the SDT failure detection timer is not counting, the first SDT procedure is determined not to be ongoing in action S530, and the UE may determine to perform the idle mode measurement and perform the idle mode measurement in the RRC inactive state in action S5501; in a case that the UE finds the SDT failure detection timer is counting, the first SDT procedure is determined to be ongoing in action S530, and the UE may determine not to perform the idle mode measurement in the RRC inactive state in action S5503.

It is noted that, in some implementations, the SDT failure (detection) timer (e.g., T319a) may be started by the UE upon a transmission of an RRCResumeRequest message or an RRCResumeRequest1 message when the UE initiates an RRC resume procedure for SDT. Then, the UE may stop the SDT failure (detection) timer (e.g., T319a) upon a reception of an RRCResume message, an RRCSetup message, an RRCRelease message or an RRCReject message from the UE's serving cell, or upon a failure to resume an RRC connection for SDT, or upon a cell reselection triggered by the UE itself.

In addition, upon an expiration of the SDT failure (detection) timer (e.g., T319a), the UE may perform the actions upon going to RRC idle state by releasing the RRC connection with a release cause 'RRC Resume failure'. Then, the UE may store this SDT failure event in the UE's own RRC Resume failure record. In some implementations, the UE may further inform the upper layers of the SDT failure event by transmitting the release cause to the upper layers of the UE.

In some implementations, the one or more idle mode measurement configurations may be received while the UE is staying in an RRC inactive state during a second SDT procedure with the first cell via the downlink control signaling. In some cases, the first SDT procedure may be the same as the second SDT procedure. In some other cases, the first SDT procedure may be different from the second SDT procedure. In other words, the SDT procedure determined ongoing in action S530 may be the same as or different from the SDT procedure used for receiving the one or more idle mode measurement configurations in action S510.

In some implementations, in a case that the first SDT procedure is determined to be ongoing in action S530, the ongoing first SDT procedure may be performed with a second cell of the serving RAN. In some cases, the second cell may be the same as the first cell from which the one or more idle mode measurement configurations are received. In some other cases, the second cell may be different from the first cell from which the one or more idle mode measurement configurations are received.

In some implementations, after determining to perform the idle mode measurement and performing the idle mode measurement in the RRC inactive state in action S5501, action S530 may be performed again. In this case, the first SDT procedure may be determined to be ongoing and the UE may stop performing the idle mode measurement. In some cases, the UE may further transmit at least one idle mode measurement report (e.g., generated based on the idle mode measurement performed in the previous action S5501) to the second cell via one or more SDT packet transmissions during the ongoing first SDT procedure.

It should be noted that, in the descriptions with reference to FIG. 5, the serving RAN may be an NR cell or an E-UTRA cell, which is not limited herein. In a case that the serving RAN is an NR cell, each of the idle mode measurement configuration, the downlink control signaling, and the first SDT procedure is associated with an NR RAT; in a case that the serving RAN is an E-UTRA cell, each of the idle mode measurement configuration, the downlink control signaling, and the first SDT procedure is associated with an E-UTRA RAT.

Figure 6:
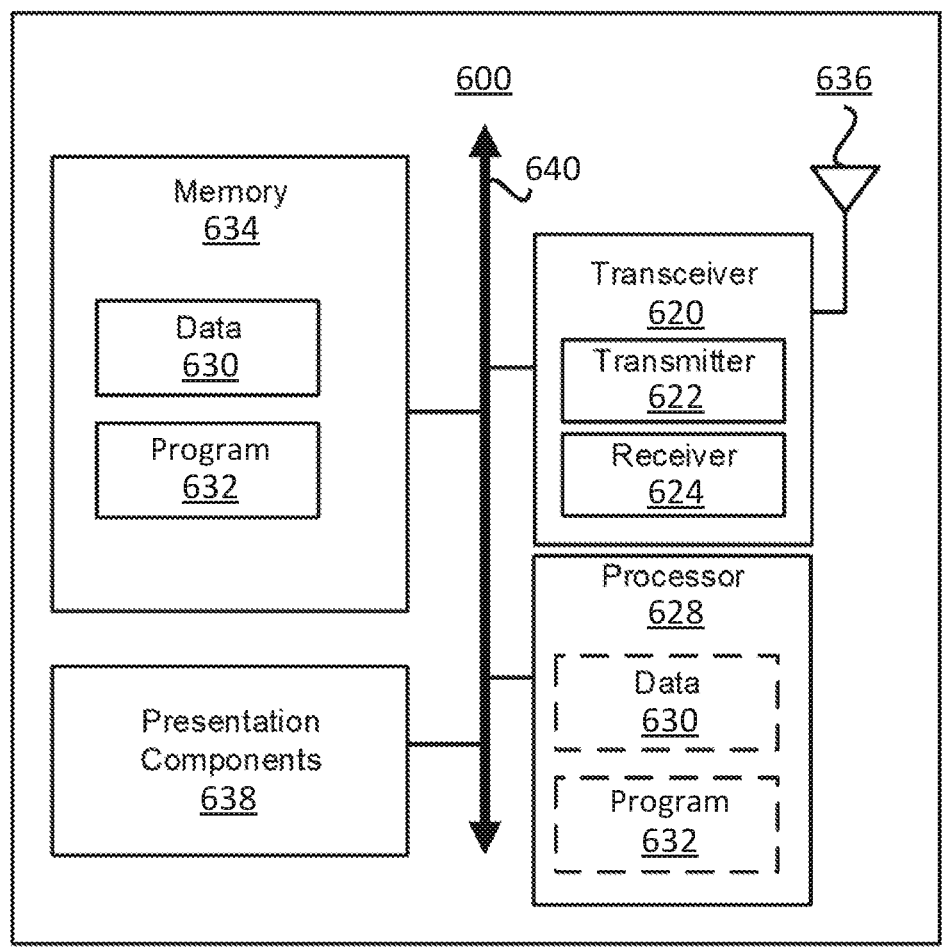
FIG. 6 is a block diagram illustrating a node for wireless communication according to an example implementation of the present disclosure.

FIG. 6 is a block diagram illustrating a node for wireless communication according to an example implementation of the present disclosure.

As illustrated in FIG. 6, the node 600 may include a transceiver 620, a processor 628, a memory 634, one or more presentation components 638, and at least one antenna 636. The node 600 may also include an RF spectrum band module, a BS communications module, a network communications module, and a system communications management module, Input/Output (I/O) ports, I/O components, and a power supply (not explicitly illustrated in FIG. 6). Each of these components may be in communication with each other, directly or indirectly, over one or more buses 640. In some implementations, the node 600 may be a UE or a BS that performs various functions described herein, for example, with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots, including, but not limited to, usable, non-usable and flexibly usable subframes and slot formats. The transceiver 620 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 634 may include computer storage media in the form of volatile and/or non-volatile memory. The memory 634 may be removable, non-removable, or a combination thereof. For example, the memory 634 may include solid-state memory, hard drives, optical-disc drives, etc. As illustrated in FIG. 6, the memory 634 may store computer-readable and/or computer-executable instructions 632 (e.g., software code(s) or computer-executable program(s)) that are configured to, when executed, cause the processor 628 to perform various functions described herein, for example, with reference to FIGS. 1 through 5. Alternatively, the instructions 632 may not be directly executable by the processor 628 but may be configured to cause the node 600 (e.g., when compiled and executed) to perform various functions described herein.

The processor 628 (e.g., having processing circuitry) may include an intelligent hardware device, a Central Processing Unit (CPU), a microcontroller, an ASIC, etc. The processor 628 may include memory. The processor 628 may process the data 630 and the instructions 632 received from memory 634, and information through the transceiver 620, the baseband communications module, and/or the network communications module. The processor 628 may also process information to be sent to the transceiver 620 for transmission through the antenna 636, to the network communications module for transmission to a CN.

One or more presentation components 638 may present data indications to a person or other devices. Examples of presentation components 638 may include a display device, speaker, printing component, vibrating component, etc.

According to the above disclosure, partial sensing operations and configurations for a UE implementing an SL-DRX mechanism may be achieved by adopting the methods introduced in the disclosure. In this way, full sensing is not the only option for the UE implementing the SL-DRX mechanism and as such the power saving may be enhanced.

From the present disclosure, it is manifested that various techniques may be used for implementing the concepts described in the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE) for performing measurements in a radio resource control (RRC) inactive state, the method comprising:
    receiving at least one idle mode measurement configuration from a first cell of a serving radio access network (RAN) via downlink control signaling, and storing the at least one idle mode measurement configuration;
    determining whether a first small data transmission (SDT) procedure is ongoing while the UE is staying in an RRC inactive state; and
    determining, based on whether the first SDT procedure is ongoing, whether to perform an idle mode measurement in the RRC inactive state according to the at least one idle mode measurement configuration.

2. The method of claim 1, further comprising:
    performing the idle mode measurement in the RRC inactive state in a case that the first SDT procedure is determined not to be ongoing, and
    forgoing performing the idle mode measurement in the RRC inactive state in a case that the first SDT procedure is determined to be ongoing.

3. The method of claim 1, wherein whether the first SDT procedure is ongoing is determined based on whether an SDT failure detection timer is counting, the method further comprising:
    performing the idle mode measurement in the RRC inactive state in a case that the SDT failure detection timer is not counting, and
    forgoing performing the idle mode measurement in the RRC inactive state in a case that the SDT failure detection timer is counting.

4. The method of claim 1, further comprising:
    starting to count down an idle mode measurement timer to zero upon receiving the at least one idle mode measurement configuration, wherein:

the at least one idle mode measurement configuration comprises an initial value of the idle mode measurement timer, and the UE keeps counting down the idle mode measurement timer upon determining not to perform the idle mode measurement while the first SDT procedure is ongoing.

5. The method of claim 4, further comprising:
releasing the stored at least one idle mode measurement configuration in a case that the idle mode measurement timer expires.

6. The method of claim 1, wherein the at least one idle mode measurement configuration comprises at least one of an idle/inactive measurement configuration or a logged measurement configuration.

7. The method of claim 1, wherein the first SDT procedure is a random access-small data transmission (RA-SDT) procedure or a configured grant-small data transmission (CG-SDT) procedure.

8. The method of claim 1, wherein the at least one idle mode measurement configuration is received from the first cell of the serving RAN via one or more SDT packet receptions during a second SDT procedure.

9. The method of claim 1, further comprising:
transmitting at least one idle mode measurement report to a second cell of the serving RAN via one or more SDT packet transmissions during the first SDT procedure.

10. The method of claim 1, wherein the serving RAN comprises at least one of a New Radio (NR) cell or an evolved-universal terrestrial radio access (E-UTRA) cell, and each of the at least one idle mode measurement configuration, the downlink control signaling and the SDT procedure is associated with an NR radio access technology (RAT) or an E-UTRA.

11. A User Equipment (UE), comprising:
one or more non-transitory computer-readable media storing one or more computer-executable instructions; and
at least one processor coupled to the one or more non-transitory computer-readable media, the at least one processor configured to execute the one or more computer-executable instructions to cause the UE to:
receive at least one idle mode measurement configuration from a first cell of a serving radio access network (RAN) via downlink control signaling, and store the at least one idle mode measurement configuration;
determine whether a first small data transmission (SDT) procedure is ongoing while the UE is staying in a radio resource control (RRC) inactive state; and
determine, based on whether the first SDT procedure is ongoing, whether to perform an idle mode measurement in the RRC inactive state according to the at least one idle mode measurement configuration.

12. The UE of claim 11, wherein the at least one processor is further configured to execute the one or more computer-executable instructions to cause the UE to:
perform the idle mode measurement in the RRC inactive state in a case that the first SDT procedure is determined not to be ongoing, and forgo performing the idle mode measurement in the RRC inactive state in a case that the first SDT procedure is determined to be ongoing.

13. The UE of claim 11, wherein whether the first SDT procedure is ongoing is determined based on whether an SDT failure detection timer is counting, and the at least one processor is further configured to execute the one or more computer-executable instructions to cause the UE to:
perform the idle mode measurement in the RRC inactive state in a case that the SDT failure detection timer is not counting, and
forgo performing the idle mode measurement in the RRC inactive state in a case that the SDT failure detection timer is counting.

14. The UE of claim 11, wherein the at least one processor is further configured to execute the one or more computer-executable instructions to cause the UE to:
start to count down an idle mode measurement timer to zero upon receiving the at least one idle mode measurement configuration, wherein:
the at least one idle mode measurement configuration comprises an initial value of the idle mode measurement timer, and
the UE keeps counting down the idle mode measurement timer upon determining not to perform the idle mode measurement while the first SDT procedure is ongoing.

15. The UE of claim 14, wherein the at least one processor is further configured to execute the one or more computer-executable instructions to cause the UE to:
release the stored at least one idle mode measurement configuration in a case that the idle mode measurement timer expires.

16. The UE of claim 11, wherein the at least one idle mode measurement configuration comprises at least one of an idle/inactive measurement configuration or a logged measurement configuration.

17. The UE of claim 11, wherein the first SDT procedure is a random access-small data transmission (RA-SDT) procedure or a configured grant-small data transmission (CG-SDT) procedure.

18. The UE of claim 11, wherein the at least one idle mode measurement configuration is received from the first cell of the serving RAN via one or more SDT packet receptions during a second SDT procedure.

19. The UE of claim 11, wherein the at least one processor is further configured to execute the one or more computer-executable instructions to cause the UE to:
transmit at least one idle mode measurement report to a second cell of the serving RAN via one or more SDT packet transmissions during the first SDT procedure.

20. The UE of claim 11, wherein the serving RAN comprises at least one of a New Radio (NR) cell or an evolved-universal terrestrial radio access (E-UTRA) cell, and each of the at least one idle mode measurement configuration, the downlink control signaling, and the first SDT procedure is associated with an NR radio access technology (RAT) or an E-UTRA RAT.

* * * * *